(12) United States Patent
Doudkin et al.

(10) Patent No.: US 9,356,892 B2
(45) Date of Patent: May 31, 2016

(54) MANAGEMENT OF ACCESS TO ENTRY POINTS ON A COMMUNICATION DEVICE

(71) Applicant: BLACKBERRY LIMITED, Waterloo (CA)

(72) Inventors: Katerina Doudkin, Haverhill, MA (US); Yevgeniy Motov, Brighton, MA (US)

(73) Assignee: BlackBerry Limited, Waterloo, Ontario (CA)

( * ) Notice: Subject to any disclaimer, the term of this patent is extended or adjusted under 35 U.S.C. 154(b) by 316 days.

(21) Appl. No.: 13/902,272

(22) Filed: May 24, 2013

(65) Prior Publication Data

US 2013/0263015 A1    Oct. 3, 2013

Related U.S. Application Data

(63) Continuation of application No. 12/904,544, filed on Oct. 14, 2010, now Pat. No. 8,472,926.

(60) Provisional application No. 61/251,557, filed on Oct. 14, 2009.

(51) Int. Cl.
*G06F 3/048* (2013.01)
*H04L 12/58* (2006.01)
*G06Q 10/10* (2012.01)
*H04M 1/725* (2006.01)

(52) U.S. Cl.
CPC ............ *H04L 51/04* (2013.01); *G06Q 10/107* (2013.01); *H04M 1/72547* (2013.01); *H04M 2201/42* (2013.01)

(58) Field of Classification Search
CPC .............. H04L 51/04; H04M 1/72547; H04M 2201/42; G06Q 10/107
See application file for complete search history.

(56) References Cited

U.S. PATENT DOCUMENTS

| | | | |
|---|---|---|---|
| 2001/0035881 A1* | 11/2001 | Stoakley et al. | 345/772 |
| 2004/0137884 A1 | 7/2004 | Engstrom et al. | |
| 2006/0009243 A1* | 1/2006 | Dahan et al. | 455/466 |
| 2007/0226658 A1 | 9/2007 | Virk | |
| 2007/0232360 A1 | 10/2007 | Bocking et al. | |
| 2007/0271527 A1 | 11/2007 | Paas et al. | |
| 2008/0256107 A1 | 10/2008 | Banga et al. | |
| 2008/0261569 A1 | 10/2008 | Britt et al. | |
| 2009/0209286 A1 | 8/2009 | Bentley et al. | |
| 2009/0228807 A1* | 9/2009 | Lemay | 715/752 |

FOREIGN PATENT DOCUMENTS

WO    2007071027 A1    6/2007

* cited by examiner

*Primary Examiner* — Rashawn Tillery
(74) *Attorney, Agent, or Firm* — Fish & Richardson P.C.

(57) ABSTRACT

A system and method for managing access to entry points in a graphical user interface on a communication device are provided. The entry points are associated with services such as message services and are actuatable to invoke a content listing display for viewing content associated with a given service. One entry point provides access to a unified inbox for display of messages received or sent via a plurality of message services. Other entry points provide access to other message services or filtered views of the unified inbox. Access to the various entry points is provided via a user interface displaying one or more user interface elements, such as icons, pointing to the various entry points. Display of the elements is managed so as to hide elements pointing to potentially duplicative views.

18 Claims, 11 Drawing Sheets

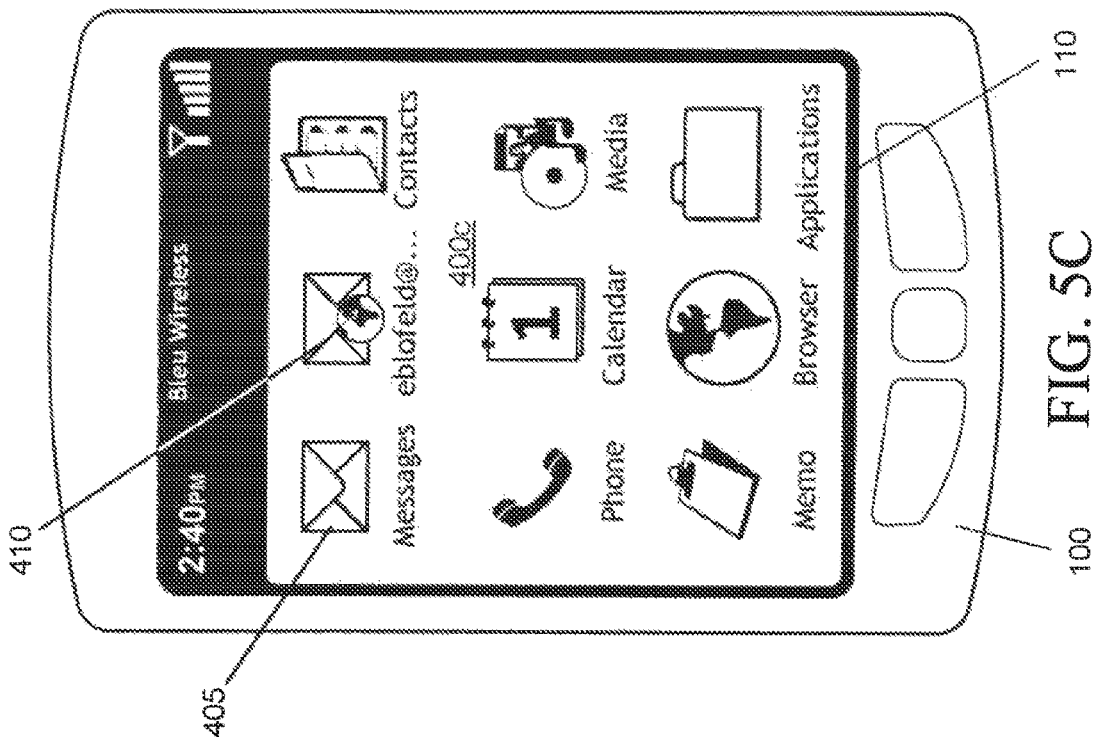
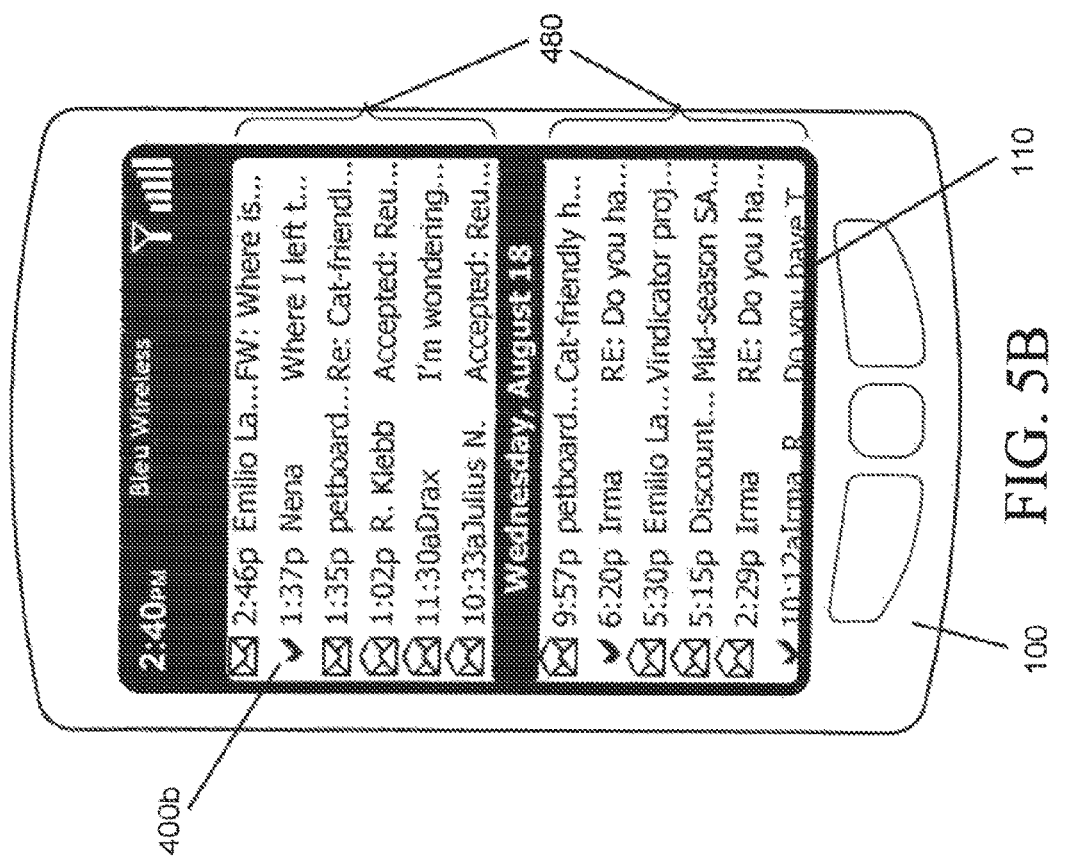
FIG. 5C
FIG. 5B

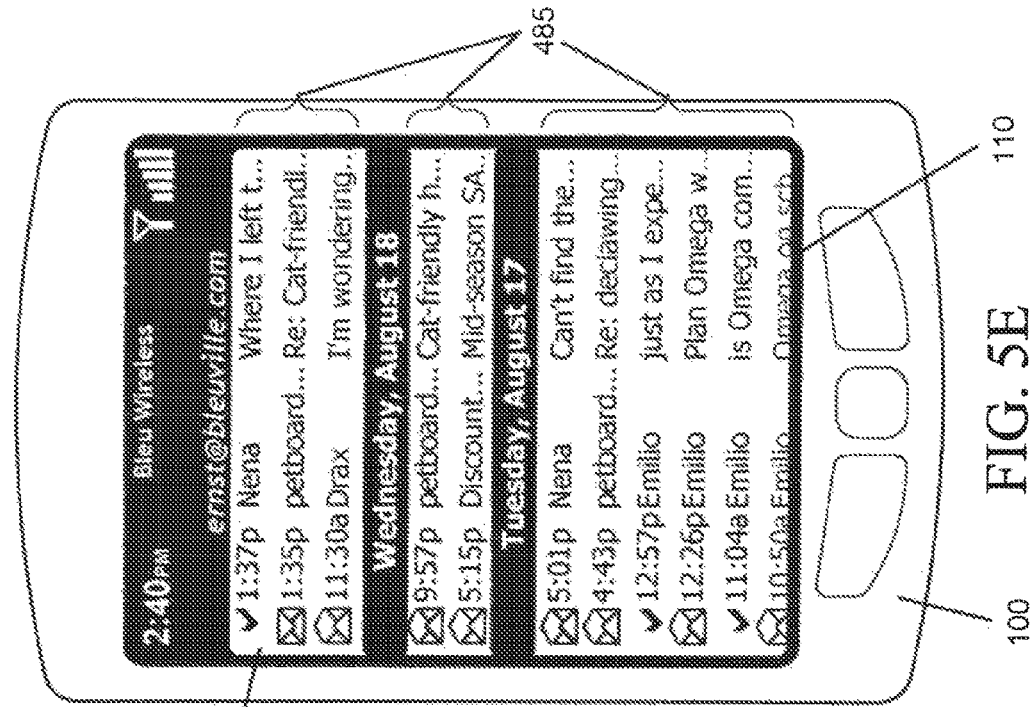
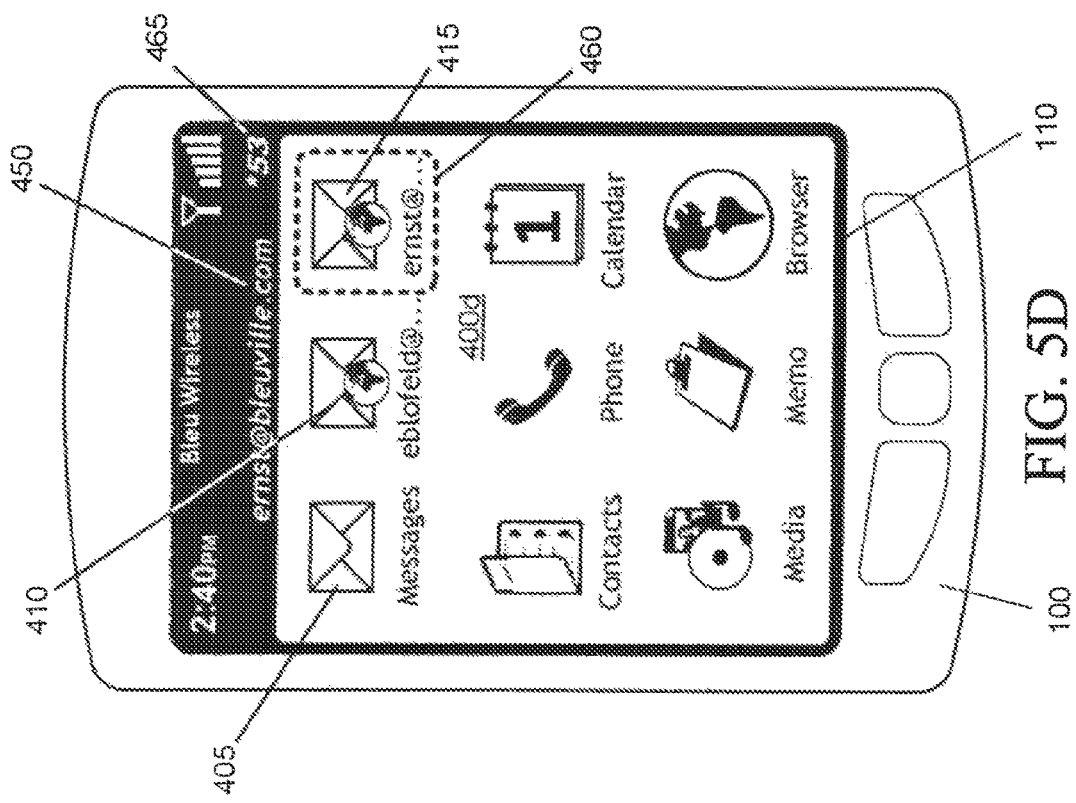
FIG. 5E
FIG. 5D

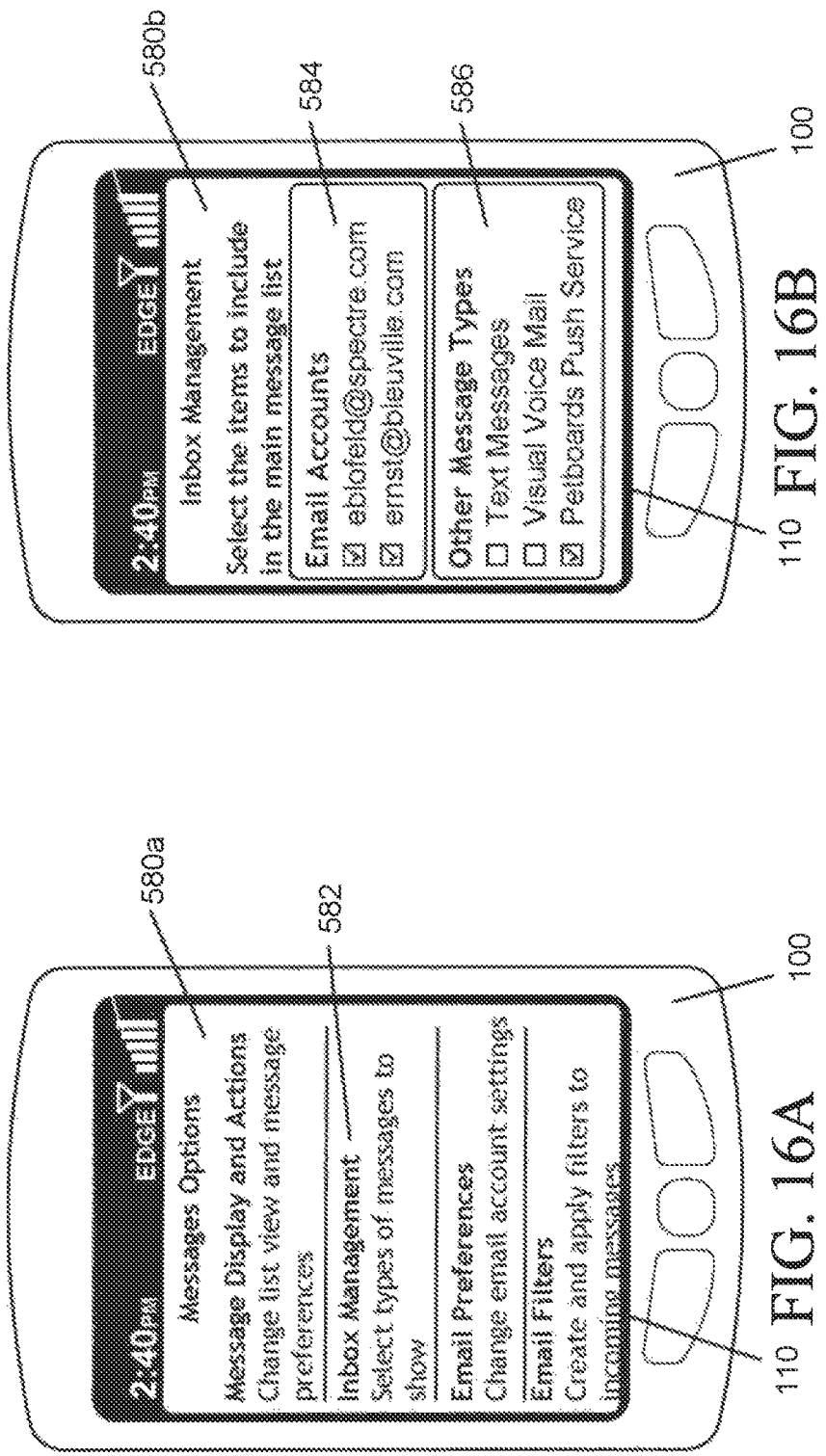

MANAGEMENT OF ACCESS TO ENTRY POINTS ON A COMMUNICATION DEVICE

CROSS-REFERENCE TO RELATED APPLICATIONS

This application is a continuation application of U.S. patent application Ser. No. 12/904,544, filed Oct. 14, 2010, now U.S. Pat. No. 8,472,926, which claims priority to U.S. Provisional Application No. 61/251,557, filed on Oct. 14, 2009, each of which is hereby incorporated by reference in its entirety.

BACKGROUND

1. Technical Field

The present invention relates to the management of communication services provisioned on a mobile communication device.

2. Description of the Related Art

Communication devices, such as smart phones, personal digital assistants (PDAs), personal computers, tablet computers, and the like, may be used to communicate electronically using one or more messaging services such as e-mail, voice communication, instant messages (IM), short message service (SMS), multimedia messaging service (MMS), voicemail, visual voice mail (VVM), and others. Communication devices may also be used to receive data from feeds or push services, for example from enterprise services, news sources, and social network services, and to transmit data to such services for publication or distribution. Users of mobile communication devices may obtain access to such services by provisioning an appropriate associated service for the mobile communication device. The service on the communication device connects to the primary service offered over a public or wireless network (such as an e-mail service), so that the user may access the primary service using the associated service. Communications, such as e-mail messages, IM, SMS, MMS, voicemail, VVM, and the like received at the mobile communication device from the primary service may be stored in one or more data stores at the device, and may be accessible to the user via a messaging application, which can retrieve communications from one or more data stores and provide user access to communications in a unified mailbox.

BRIEF DESCRIPTION OF THE DRAWINGS

In drawings which illustrate by way of example only embodiments of the present invention.

FIGS. 5A to 5F are diagrams illustrating graphical user interfaces for providing access to messaging services or messaging application entry points, displayable on the mobile device of FIG. 1.

FIGS. 16A and 16B are illustrations of graphical user interfaces for selecting options, displayable on the mobile device of FIG. 1.

DETAILED DESCRIPTION

Figure 1:
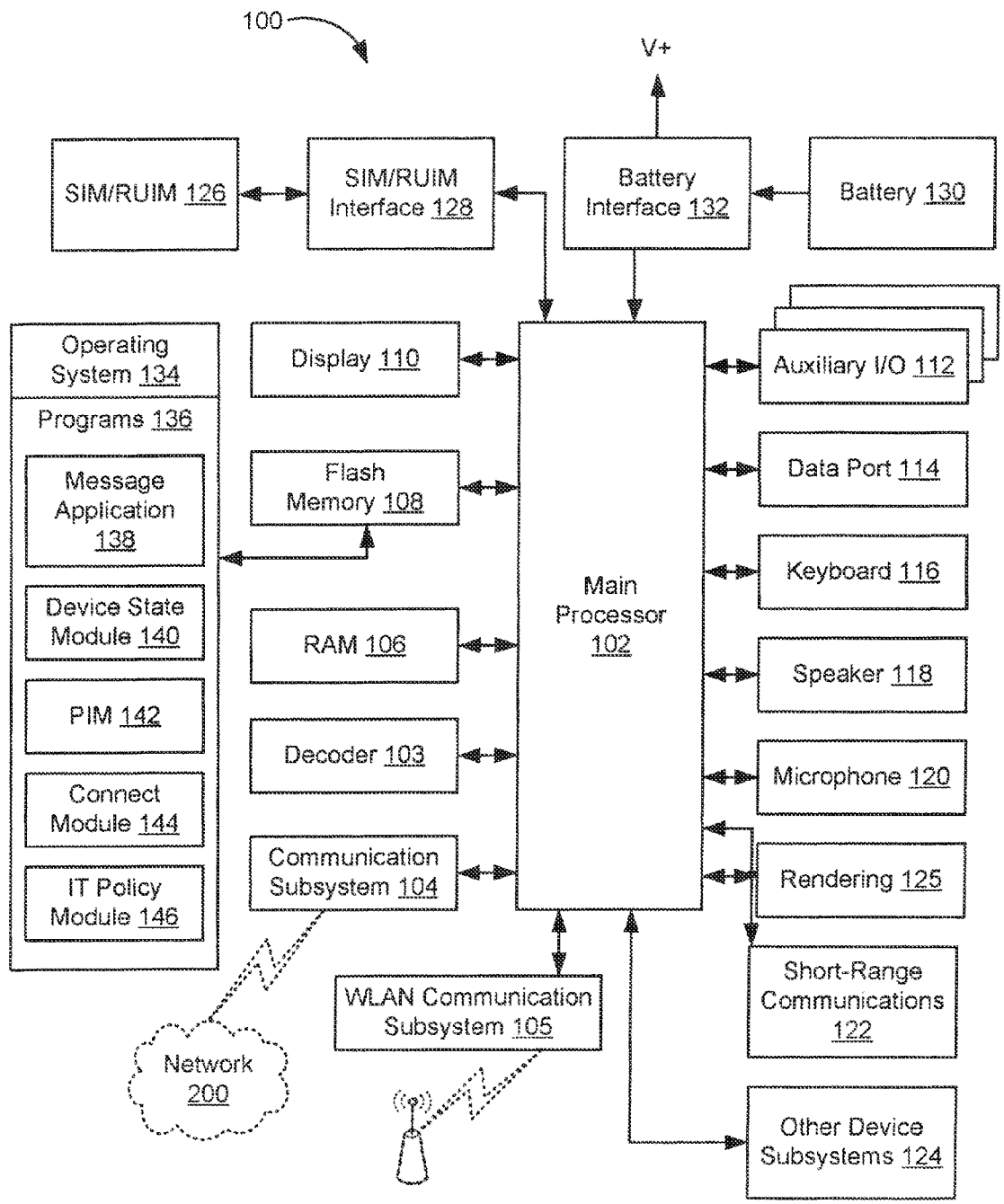
FIG. 1 is a block diagram of an embodiment of a mobile device.

The embodiments described herein provide a system and method for managing multiple services, such as messaging services, provisioned or registered at a mobile communication device and for managing access to service entry points for such services. These embodiments will be described and illustrated primarily in relation to a mobile wireless communication device, hereafter referred to as a mobile communication device or communication device. It will be appreciated by those skilled in the art, however, that this description is not intended to limit the scope of the described embodiments to mobile wireless communication devices. The methods and systems described herein may be applied to any appropriate communication device or data processing device adapted to communicate with another communication or data processing device over a fixed or wireless connection, including without limitation cellular phones, smartphones, wireless organizers, personal digital assistants, desktop computers, terminals, laptops, tablets, handheld wireless communication devices, wirelessly-enabled notebook computers and the like. Throughout the specification, terms such as "may" and "can" are used interchangeably and use of any particular term should not be construed as limiting the scope or requiring experimentation to implement the claimed subject matter or embodiments described herein.

Thus, in accordance with the embodiments described herein, there is provided a communication device such as a wireless communication device for providing access to messaging services, the communication device comprising a management module adapted to register services at the communication device; and at least one processor in communication with a display configured to, when a single messaging service is registered with the management module, provide or enable user interface access to said single messaging service through display in a user interface display of a user interface element pointing to an entry point for a unified view of message data, said unified view comprising a display of message data for each messaging service registered with the management module; and when at least two messaging services are registered with the management module, enable user interface access to each of the at least two messaging services through display in the user interface display of: the user interface element pointing to the entry point for the unified view of message data; and for each of the at least two messaging services, a user interface element pointing to a corresponding one of the at least two messaging services.

In a further aspect, the communication device is further configured to, when only one remaining messaging service is registered with the management module, provide or enable user interface access to said remaining messaging service on the communication device by displaying, in said user interface display, the user interface element pointing to the entry point for the unified view of message data.

In still a further aspect, the communication device processor may be further configured to receive an instruction to hide a displayed user interface element pointing to an entry point for a messaging service, and hide said displayed user interface element in response to said received instruction, thus disabling user interface access to that messaging service; or additionally or alternatively receive an instruction to expressly display or enable user interface access through display of a user interface element in the user interface display pointing to said entry point for said single messaging service when said single messaging service is registered with the management module; and display the user interface element pointing to said entry point for said single messaging service in response to said received instruction.

There is also provided a method for managing access to service entry points on a communication device, which may comprise a wireless communication device, comprising: when a single messaging service is registered with a management module on the communication device, providing user interface access to said single messaging service by displaying, in a user interface display at the communication device, a user interface element pointing to an entry point for a unified view of message data, said unified view comprising a display of message data for each messaging service registered with the management module; and when at least two messaging services are registered with the management module, providing user interface access to each of the at least two messaging services by displaying in the user interface display: the user interface element pointing to the entry point for the unified view of message data; for each of the at least two messaging services, a user interface element pointing to a corresponding one of the at least two messaging services.

In a further aspect, the method further comprises detecting deregistration from the management module of a previously-registered messaging service; and when only one remaining messaging service is registered with the management module, providing user interface access to said remaining messaging service on the communication device by displaying, in said user interface display, the user interface element pointing to the entry point for the unified view of message data. The method may further comprise, in response to an instruction to hide a displayed user interface element pointing to an entry point, hiding said displayed user interface element, and additionally or alternatively may comprise displaying a user interface element pointing to said single messaging service in response to an instruction to expressly display said user interface element.

In yet a further aspect, each of said entry points comprises a message inbox.

In another aspect, the single messaging service may comprise a content feed service or an e-mail service.

In a further aspect, the user interface element may comprise an icon, and additionally the user interface display may comprise a home screen display.

There is also provided a method for managing access to service entry points on a communication device such as a wireless communication device, the method comprising: detecting registration of a first messaging service with a management module at the communication device; on determining that no other messaging service is registered with the management module, providing user interface access to said first messaging service on the communication device by displaying, in a user interface display, a user interface element associated with an entry point for a unified view of message data, the unified view comprising a display of message data for each messaging service registered with the management module; on determining that at least a second messaging service is registered with the management module, providing user interface access to said first messaging service and said second messaging service in said user interface display by displaying: the user interface element associated with the entry point for the unified view of message data; a first user interface element associated with an entry point for said first messaging service; and a second user interface element associated with an entry point for said second messaging service.

In another aspect, there is also provided a computer program product comprising a computer readable medium, which may include a non-transitory storage medium, storing computer executable instructions which, when executed on one or more processors of a communication device, cause the system to carry out all or part of the methods of the embodiments described herein.

Figure 2:
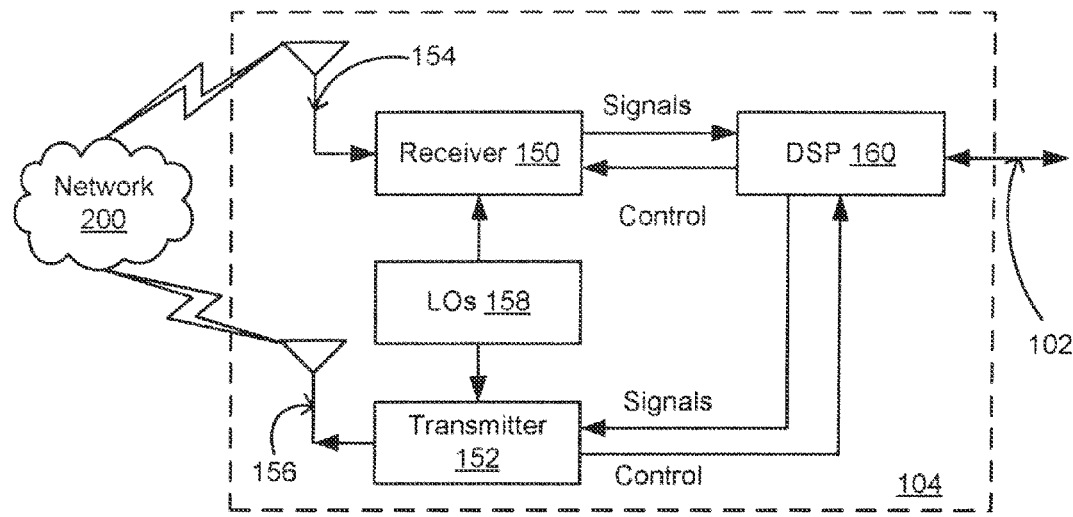
FIG. 2 is a block diagram of an embodiment of a communication subsystem component of the mobile device of FIG. 1.
Figure 3:
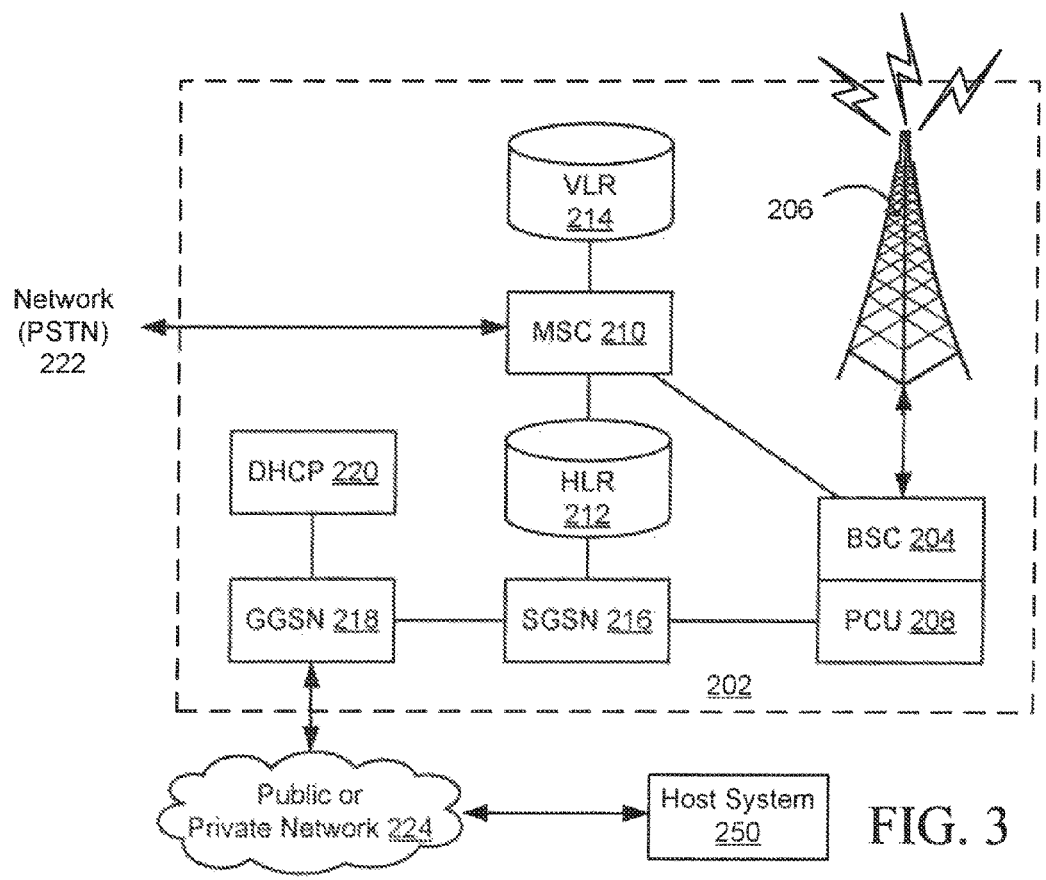
FIG. 3 is an exemplary block diagram of a node of a wireless network for use with the mobile device of FIG. 1.
Figure 4A:
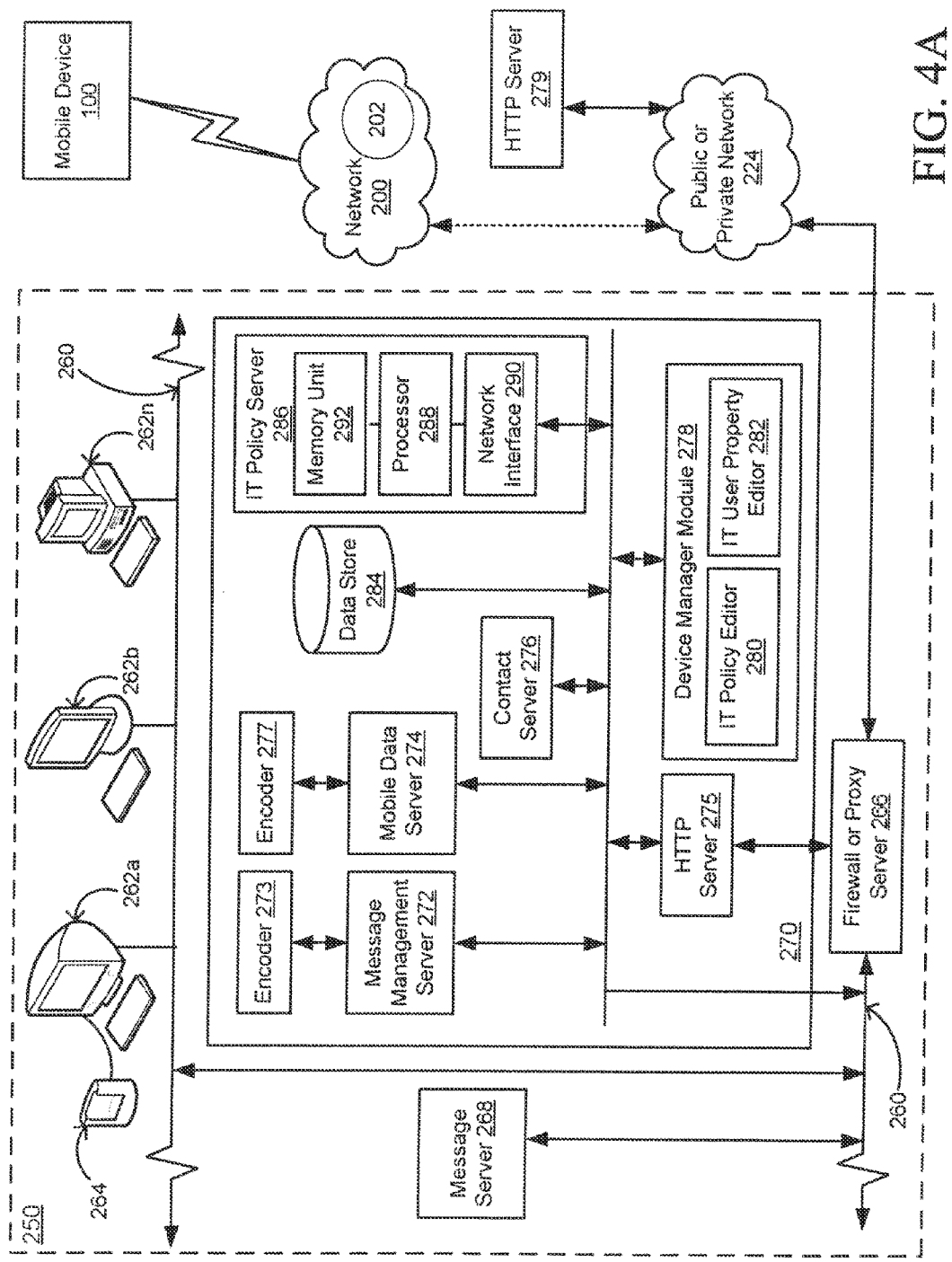
FIG. 4A is a block diagram illustrating components of a host system in one exemplary configuration for use with the wireless network of FIG. 3 and the mobile device of FIG. 1.
Figure 4B:
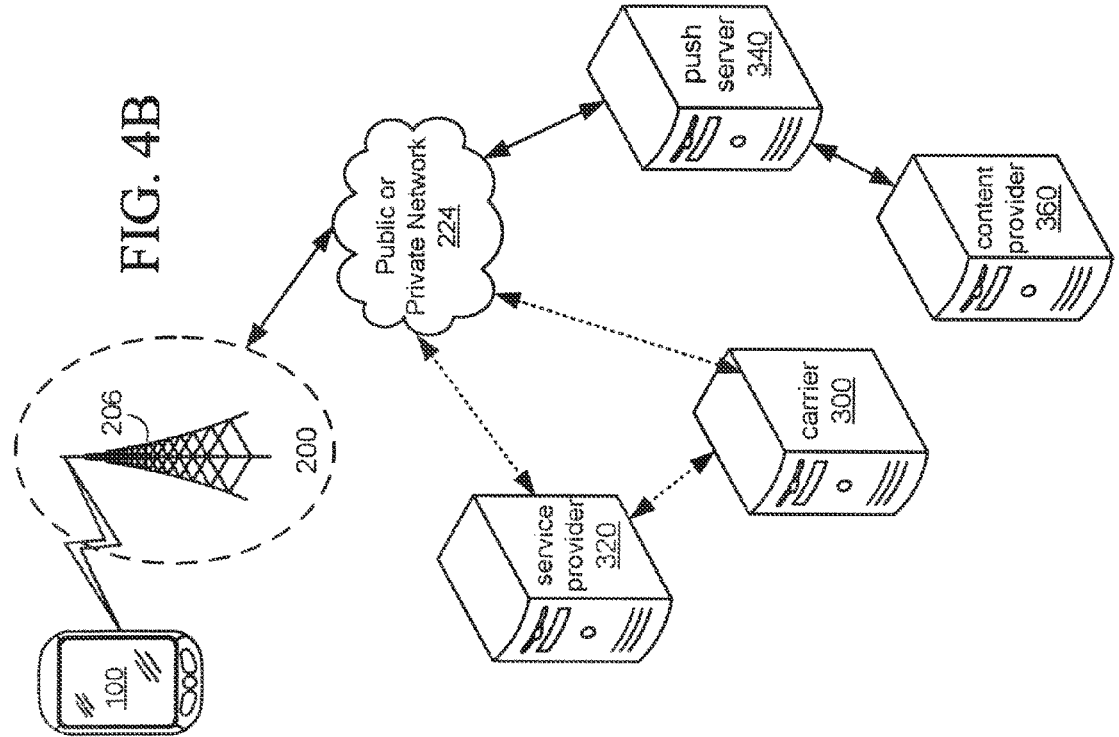
FIG. 4B is a schematic diagram illustrating a possible network topology for provisioning or pushing messages to the communication device.

The embodiments described herein may be implemented on a communication device such as that illustrated in FIGS. 1 and 2. The communication device may communicate with other devices over a wireless communication system or enterprise system as illustrated in FIGS. 3 and 4. The communication device 100 may be a mobile device with two-way communication and advanced data communication capabilities including the capability to communicate with other mobile devices or computer systems through a network of transceiver stations. The communication device 100 can also have voice communication capabilities.

FIG. 1 is a block diagram of an exemplary embodiment of a communication device 100. The communication device 100 includes a number of components such as a main processor 102 that controls the overall operation of the communication device 100. Communication functions, including data and voice communications, are performed through a communication subsystem 104. Data received by the communication device 100 can be decompressed and decrypted by decoder 103, operating according to any suitable decompression techniques, and encryption/decryption techniques according to various standards, such as Data Encryption Standard (DES), Triple DES, or Advanced Encryption Standard (AES)). Image data is typically compressed and decompressed in accordance with appropriate standards, such as JPEG, while video data is typically compressed and decompressed in accordance with appropriate standards, such as H.26x and MPEG-x series standards.

The communication subsystem 104 receives messages from and sends messages to a wireless network 200. In this exemplary embodiment of the communication device 100, the communication subsystem 104 is configured in accordance with one or more of Global System for Mobile Communication (GSM), General Packet Radio Services (GPRS) standards, Enhanced Data GSM Environment (EDGE) and Universal Mobile Telecommunications Service (UMTS). New standards are still being defined, but it is believed that they will have similarities to the network behavior described herein, and it will also be understood by persons skilled in the art that the embodiments described herein are intended to use any other suitable standards that are developed in the future. The wireless link connecting the communication subsystem 104 with the wireless network 200 represents one or more different Radio Frequency (RF) channels, operating according to defined protocols specified for GSM, GPRS, EDGE, or UMTS, and optionally other network communications. With newer network protocols, these channels are capable of supporting both circuit switched voice communications and packet switched data communications.

Other wireless networks can also be associated with the communication device 100 in variant implementations. The different types of wireless networks that can be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks, third-generation (3G) networks like EDGE, HSPA, HSPA+, EVDO and UMTS, or fourth-generation (4G) networks such as LTE and LTE Advanced. Some other examples of data-centric networks include WiFi 802.11™, Mobitex™ and DataTAC™ network communication systems. Examples of other voice-centric data networks include Personal Communication Systems (PCS) networks like GSM and Time Division Multiple Access (TDMA) systems. The mobile device 100 may be provided with additional communication subsystems, such as the wireless LAN (WLAN) communication subsystem 105 also shown in FIG. 1. The WLAN communication subsystem may operate in accordance with a known network protocol such as one or more of the 802.11™ family of standards developed by IEEE. The communication subsystem 105 may be separate from, or integrated with, the communication subsystem 104 or with the short-range communications module 122. The main processor 102 also interacts with additional subsystems such as a Random Access Memory (RAM) 106, a flash memory 108, a display 110, an auxiliary input/output (I/O) subsystem 112, a data port 114, a keyboard 116, a speaker 118, a microphone 120, the short-range communications 122 and other device subsystems 124.

Some of the subsystems of the communication device 100 perform communication-related functions, whereas other subsystems can provide "resident" or on-device functions. By way of example, the display 110 and the keyboard 116 can be used for both communication-related functions, such as entering a text message for transmission over the network 200, and device-resident functions such as a calculator or task list.

A rendering circuit 125 is included in the device 100. When a user specifies that a data file is to be viewed on the display 110, the rendering circuit 125 analyzes and processes the data file for visualization on the display 110. Rendering data files originally optimized or prepared for visualization on large-screen displays on a portable electronic device display often requires additional processing prior to visualization on the small-screen portable electronic device displays. This additional processing may be accomplished by the rendering engine 125. As will be appreciated by those of skill in the art, the rendering engine can be implemented in hardware, software, or a combination thereof, and can comprise a dedicated image processor and associated circuitry, or can be implemented within main processor 102.

The communication device 100 can send and receive communication signals over the wireless network 200 after required network registration or activation procedures have been completed. Network access is associated with a subscriber or user of the communication device 100. To identify a subscriber, the communication device 100 requires a SIM/RUIM card 126 (i.e. Subscriber Identity Module or a Removable User Identity Module) to be inserted into a SIM/RUIM interface 128 in order to communicate with a network. The SIM/RUIM card 126 is one type of a conventional "smart card" that can be used to identify a subscriber of the communication device 100 and to personalize the communication device 100, among other things. Without the SIM/RUIM card 126, the communication device 100 is not fully operational for communication with the wireless network 200. By inserting the SIM/RUIM card 126 into the SIM/RUIM interface 128, a subscriber can access all subscribed services. Services can include: web browsing and messaging such as e-mail, voice mail, Short Message Service (SMS), and Multimedia Messaging Services (MMS). More advanced services can include: point of sale, field service and sales force automation. The SIM/RUIM card 126 includes a processor and memory for storing information. Once the SIM/RUIM card 126 is inserted into the SIM/RUIM interface 128, it is coupled to the main processor 102. In order to identify the subscriber, the SIM/RUIM card 126 can include some user parameters such as an International Mobile Subscriber Identity (IMSI). An advantage of using the SIM/RUIM card 126 is that a subscriber is not necessarily bound by any single physical mobile device. The SIM/RUIM card 126 can store additional subscriber information for a mobile device as well, including datebook (or calendar) information and recent call information. Alternatively, user identification information can also be programmed into the flash memory 108.

The communication device 100 may be a battery-powered device including a battery interface 132 for receiving one or more rechargeable batteries 130. In at least some embodiments, the battery 130 can be a smart battery with an embedded microprocessor. The battery interface 132 is coupled to a regulator (not shown), which assists the battery 130 in providing power V+ to the communication device 100. Although current technology makes use of a battery, future technologies such as micro fuel cells can provide the power to the communication device 100.

The communication device 100 also includes an operating system 134 and software components 136 to 146 which are described in more detail below. The operating system 134 and the software components 136 to 146 that are executed by the main processor 102 are typically stored in a persistent store such as the flash memory 108, which can alternatively be a read-only memory (ROM) or similar storage element (not shown). Those skilled in the art will appreciate that portions of the operating system 134 and the software components 136 to 146, such as specific device applications, or parts thereof, can be temporarily loaded into a volatile store such as the RAM 106. Other software components can also be included, as is well known to those skilled in the art.

The subset of software applications 136 that control basic device operations, including data and voice communication applications, will normally be installed on the communication device 100 during its manufacture. Other software applications include a message application 138 that can be any suitable software program that allows a user of the communication device 100 to send and receive electronic messages. Various alternatives exist for the message application 138 as is well known to those skilled in the art. Messages that have been sent or received by the user are typically stored in the flash memory 108 of the communication device 100 or some other suitable storage element in the communication device 100. In at least some embodiments, some of the sent and received messages can be stored remotely from the device 100 such as in a data store of an associated host system that the communication device 100 communicates with.

The software applications can further include a device state module 140, a Personal Information Manager (PIM) 142, and other suitable modules (not shown). The device state module 140 provides persistence, i.e. the device state module 140 ensures that important device data is stored in persistent memory, such as the flash memory 108, so that the data is not lost when the communication device 100 is turned off or loses power.

The PIM 142 includes functionality for organizing and managing data items of interest to the user, such as, but not limited to, e-mail, contacts, calendar events, voice mails, appointments, and task items. A PIM application has the ability to send and receive data items via the wireless network 200. PIM data items can be seamlessly integrated, synchronized, and updated via the wireless network 200 with the mobile device subscriber's corresponding data items stored and/or associated with a host computer system. This functionality creates a mirrored host computer on the communication device 100 with respect to such items. This can be particularly advantageous when the host computer system is the mobile device subscriber's office computer system.

The communication device 100 also includes a connect module 144, and an information technology (IT) policy module 146. The connect module 144 implements the communication protocols that are required for the communication device 100 to communicate with the wireless infrastructure and any host system, such as an enterprise system, that the communication device 100 is authorized to interface with. Examples of a wireless infrastructure and an enterprise system are given in FIGS. 3 and 4, which are described in more detail below.

The connect module 144 includes a set of Application Programming Interfaces (APIs) that can be integrated with the communication device 100 to allow the communication device 100 to use any number of services associated with the enterprise system or with other systems accessible over the network 200. The connect module 144 allows the communication device 100 to establish an end-to-end secure, authenticated communication pipe with the host system. A subset of applications for which access is provided by the connect module 144 can be used to pass IT policy commands from the host system to the communication device 100. This can be done in a wireless or wired manner. These instructions can then be passed to the IT policy module 146 to modify the configuration of the device 100. Alternatively, in some cases, the IT policy update can also be done over a wired connection.

Other types of software applications can also be installed on the communication device 100. These software applications can be third party applications, which are added after the manufacture of the communication device 100. Examples of third party applications include games, calculators, utilities, etc.

The additional applications can be loaded onto the communication device 100 through at least one of the wireless network 200, the auxiliary I/O subsystem 112, the data port 114, the short-range communications subsystem 122, or any other suitable device subsystem 124. This flexibility in application installation increases the functionality of the communication device 100 and can provide enhanced on-device functions, communication-related functions, or both. For example, secure communication applications can enable electronic commerce functions and other such financial transactions to be performed using the communication device 100.

The data port 114 enables a subscriber to set preferences through an external device or software application and extends the capabilities of the communication device 100 by providing for information or software downloads to the communication device 100 other than through a wireless communication network. The alternate download path can, for example, be used to load an encryption key onto the communication device 100 through a direct and thus reliable and trusted connection to provide secure device communication. The data port 114 can be any suitable port that enables data communication between the communication device 100 and another computing device. The data port 114 can be a serial or a parallel port. In some instances, the data port 114 can be a USB port that includes data lines for data transfer and a supply line that can provide a charging current to charge the battery 130 of the communication device 100.

The short-range communications subsystem 122 provides for communication between the communication device 100 and different systems or devices, without the use of the wireless network 200. For example, the subsystem 122 can include an infrared device and associated circuits and components for short-range communication. Examples of short-range communication standards include standards developed by the Infrared Data Association (IrDA), Bluetooth™, and the 802.11™ family of standards developed by IEEE, including Wi-Fi and Wi-Fi Direct.

In use, a received signal such as a text message, an e-mail message, or web page download will be processed by the communication subsystem 104 and input to the main processor 102. The main processor 102 will then process the received signal for output to the display 110 or alternatively to the auxiliary I/O subsystem 112. A subscriber can also compose data items, such as e-mail messages, for example, using the keyboard 116 in conjunction with the display 110 and possibly the auxiliary I/O subsystem 112. The auxiliary subsystem 112 can include devices such as: a touchscreen, mouse, track ball, infrared fingerprint detector, or a roller wheel with dynamic button pressing capability. The keyboard 116 is preferably an alphanumeric keyboard and/or telephone-type keypad. However, other types of keyboards can also be used. A composed item can be transmitted over the wireless network 200 through the communication subsystem 104. It will be appreciated that if the display 110 comprises a touchscreen, then the auxiliary subsystem 112 may still comprise one or more of the devices identified above.

For voice communications, the overall operation of the communication device 100 is substantially similar, except that the received signals are output to the speaker 118, and signals for transmission are generated by the microphone 120. Alternative voice or audio I/O subsystems, such as a voice message recording subsystem, can also be implemented on the communication device 100. Although voice or audio signal output is accomplished primarily through the speaker 118, the display 110 can also be used to provide additional information such as the identity of a calling party, duration of a voice call, or other voice call related information.

FIG. 2 shows an exemplary block diagram of the communication subsystem component 104. The communication subsystem 104 includes a receiver 150, a transmitter 152, as well as associated components such as one or more embedded or internal antenna elements 154 and 156, Local Oscillators (LOs) 158, and a processing module such as a Digital Signal Processor (DSP) 160. The particular design of the communication subsystem 104 is dependent upon the communication network 200 with which the communication device 100 is intended to operate. Thus, it should be understood that the design illustrated in FIG. 2 serves only as one example.

Signals received by the antenna 154 through the wireless network 200 are input to the receiver 150, which can perform such common receiver functions as signal amplification, frequency down conversion, filtering, channel selection, and analog-to-digital (A/D) conversion. A/D conversion of a received signal allows more complex communication functions such as demodulation and decoding to be performed in the DSP 160. In a similar manner, signals to be transmitted are processed, including modulation and encoding, by the DSP 160. These DSP-processed signals are input to the transmitter 152 for digital-to-analog (D/A) conversion, frequency up conversion, filtering, amplification and transmission over the wireless network 200 via the antenna 156. The DSP 160 not only processes communication signals, but also provides for receiver and transmitter control. For example, the gains applied to communication signals in the receiver 150 and the transmitter 152 can be adaptively controlled through automatic gain control algorithms implemented in the DSP 160.

The wireless link between the communication device 100 and the wireless network 200 can contain one or more different channels, typically different RF channels, and associated protocols used between the communication device 100 and the wireless network 200. An RF channel is a limited resource that should be conserved, typically due to limits in overall bandwidth and limited battery power of the communication device 100. When the communication device 100 is fully operational, the transmitter 152 is typically keyed or turned on only when it is transmitting to the wireless network 200 and is otherwise turned off to conserve resources. Similarly, the receiver 150 is periodically turned off to conserve power until it is needed to receive signals or information (if at all) during designated time periods.

FIG. 3 is a block diagram of an exemplary implementation of a node 202 of the wireless network 200. In practice, the wireless network 200 comprises one or more nodes 202. In conjunction with the connect module 144, the communication device 100 can communicate with the node 202 within the wireless network 200. In the exemplary implementation of FIG. 3, the node 202 is configured in accordance with General Packet Radio Service (GPRS) and Global Systems for Mobile (GSM) technologies. The node 202 includes a base station controller (BSC) 204 with an associated tower station 206, a Packet Control Unit (PCU) 208 added for GPRS support in GSM, a Mobile Switching Center (MSC) 210, a Home Location Register (HLR) 212, a Visitor Location Registry (VLR) 214, a Serving GPRS Support Node (SGSN) 216, a Gateway GPRS Support Node (GGSN) 218, and a Dynamic Host Configuration Protocol (DHCP) 220. This list of components is not meant to be an exhaustive list of the components of every node 202 within a GSM/GPRS network, but rather a list of components that are commonly used in communications through the network 200.

In a GSM network, the MSC 210 is coupled to the BSC 204 and to a landline network, such as a Public Switched Telephone Network (PSTN) 222 to satisfy circuit switched requirements. The connection through the PCU 208, the SGSN 216 and the GGSN 218 to a public or private network (Internet) 224 (also referred to herein generally as a shared network infrastructure) represents the data path for GPRS capable mobile devices. In a GSM network extended with GPRS capabilities, the BSC 204 also contains the Packet Control Unit (PCU) 208 that connects to the SGSN 216 to control segmentation, radio channel allocation and to satisfy packet switched requirements. To track the location of the communication device 100 and availability for both circuit switched and packet switched management, the HLR 212 is shared between the MSC 210 and the SGSN 216. Access to the VLR 214 is controlled by the MSC 210.

The station 206 is a fixed transceiver station and together with the BSC 204 form fixed transceiver equipment. The fixed transceiver equipment provides wireless network coverage for a particular coverage area commonly referred to as a "cell". The fixed transceiver equipment transmits communication signals to and receives communication signals from mobile devices within its cell via the station 206. The fixed transceiver equipment normally performs such functions as modulation and possibly encoding and/or encryption of signals to be transmitted to the communication device 100 in accordance with particular, usually predetermined, communication protocols and parameters, under control of its controller. The fixed transceiver equipment similarly demodulates and possibly decodes and decrypts, if necessary, any communication signals received from the communication device 100 within its cell. Communication protocols and parameters can vary between different nodes. For example, one node can employ a different modulation scheme and operate at different frequencies than other nodes.

For all communication devices 100 registered with a specific network, permanent configuration data such as a user profile is stored in the HLR 212. The HLR 212 also contains location information for each registered mobile device and can be queried to determine the current location of a mobile device. The MSC 210 is responsible for a group of location areas and stores the data of the mobile devices currently in its area of responsibility in the VLR 214. Further, the VLR 214 also contains information on mobile devices that are visiting other networks. The information in the VLR 214 includes part of the permanent mobile device data transmitted from the HLR 212 to the VLR 214 for faster access. By moving additional information from a remote HLR 212 node to the VLR 214, the amount of traffic between these nodes can be reduced so that voice and data services can be provided with faster response times and at the same time requiring less use of computing resources.

The SGSN 216 and the GGSN 218 are elements added for GPRS support; namely packet switched data support, within GSM. The SGSN 216 and the MSC 210 have similar responsibilities within the wireless network 200 by keeping track of the location of each communication device 100. The SGSN 216 also performs security functions and access control for data traffic on the wireless network 200. The GGSN 218 provides internetworking connections with external packet switched networks and connects to one or more SGSNs 216 via an Internet Protocol (IP) backbone network operated within the network 200. During normal operations, a given communication device 100 must perform a "GPRS Attach" to acquire an IP address and to access data services. This requirement is not present in circuit switched voice channels as Integrated Services Digital Network (ISDN) addresses are used for routing incoming and outgoing calls. Currently, all GPRS capable networks use private, dynamically assigned IP addresses, thus requiring the DHCP server 220 connected to the GGSN 218. There are many mechanisms for dynamic IP assignment, including using a combination of a Remote Authentication Dial-In User Service (RADIUS) server and a DHCP server. Once the GPRS Attach is complete, a logical connection is established from a communication device 100, through the PCU 208, and the SGSN 216 to an Access Point Node (APN) within the GGSN 218. The APN represents a logical end of an IP tunnel that can either access direct Internet compatible services or private network connections. The APN also represents a security mechanism for the network 200, insofar as each communication device 100 must be assigned to one or more APNs and communication devices 100 cannot exchange data without first performing a GPRS Attach to an APN that it has been authorized to use. The APN can be considered to be similar to an Internet domain name such as "myconnection.wireless.com".

Once the GPRS Attach operation is complete, a tunnel is created and all traffic is exchanged within standard IP packets using any protocol that can be supported in IP packets. This includes tunneling methods such as IP over IP as in the case with some IPSecurity (Ipsec) connections used with Virtual Private Networks (VPN). These tunnels are also referred to as Packet Data Protocol (PDP) Contexts and there are a limited number of these available in the network 200. To maximize use of the PDP Contexts, the network 200 will run an idle timer for each PDP Context to determine if there is a lack of activity. When a communication device 100 is not using its PDP Context, the PDP Context can be de-allocated and the IP address returned to the IP address pool managed by the DHCP server 220.

FIG. 4 is a block diagram illustrating components of an exemplary configuration of a host system 250 with which the communication device 100 can communicate in conjunction with the connect module 144. The host system 250 will typically be a corporate enterprise or other local area network (LAN), but can also be a home office computer or some other private system, for example, in variant implementations. In the example shown in FIG. 4, the host system 250 is depicted as a LAN of an organization to which a user of the communication device 100 belongs. Typically, a plurality of mobile devices can communicate wirelessly with the host system 250 through one or more nodes 202 of the wireless network 200.

The host system 250 comprises a number of network components connected to each other by a network 260. For instance, a user's desktop computer 262a with an accompanying cradle 264 for the user's communication device 100 is situated on a LAN connection. The cradle 264 for the communication device 100 can be coupled to the computer 262a by a serial or a Universal Serial Bus (USB) connection, for example. Other user computers 262b-262n are also situated on the network 260, and each can be equipped with an accompanying cradle 264. The cradle 264 facilitates the loading of information (e.g. PIM data, private symmetric encryption keys to facilitate secure communications) from the user computer 262a to the communication device 100, and can be particularly useful for bulk information updates often performed in initializing the communication device 100 for use. The information downloaded to the communication device 100 can include certificates used in the exchange of messages.

It will be understood by persons skilled in the art that the user computers 262a-262n are typically also connected to other peripheral devices, such as printers, etc., which are not explicitly shown in FIG. 4. Furthermore, only a subset of network components of the host system 250 are shown in FIG. 4 for ease of exposition, and it will be understood by persons skilled in the art that the host system 250 will comprise additional components that are not explicitly shown in FIG. 4 for this exemplary configuration. More generally, the host system 250 can represent a smaller part of a larger network (not shown) of the organization, and can comprise different components and/or be arranged in different topologies than that shown in the exemplary embodiment of FIG. 4.

To facilitate the operation of the communication device 100 and the wireless communication of messages and message-related data between the communication device 100 and components of the host system 250, a number of wireless communication support components 270 can be provided. In some implementations, the wireless communication support components 270 can include a message management server 272, a mobile data server 274, a web server, such as Hypertext Transfer Protocol (HTTP) server 275, a contact server 276, and a device manager module 278. HTTP servers can also be located outside the enterprise system, as indicated by the HTTP server 279 attached to the network 224. The device manager module 278 includes an IT Policy editor 280 and an IT user property editor 282, as well as other software components for allowing an IT administrator to configure the communication devices 100. In an alternative embodiment, there can be one editor that provides the functionality of both the IT policy editor 280 and the IT user property editor 282. The support components 270 also include a data store 284, and an IT policy server 286. The IT policy server 286 includes a processor 288, a network interface 290 and a memory unit 292. The processor 288 controls the operation of the IT policy server 286 and executes functions related to the standardized IT policy as described below. The network interface 290 allows the IT policy server 286 to communicate with the various components of the host system 250 and the communication devices 100. The memory unit 292 can store functions used in implementing the IT policy as well as related data. Those skilled in the art know how to implement these various components. Other components can also be included as is well known to those skilled in the art. Further, in some implementations, the data store 284 can be part of any one of the servers.

In this exemplary embodiment, the communication device 100 communicates with the host system 250 through node 202 of the wireless network 200 and a shared network infrastructure 224 such as a service provider network or the public Internet. Access to the host system 250 can be provided through one or more routers (not shown), and computing devices of the host system 250 can operate from behind a firewall or proxy server 266. The proxy server 266 provides a secure node and a wireless internet gateway for the host system 250. The proxy server 266 intelligently routes data to the correct destination server within the host system 250.

In some implementations, the host system 250 can include a wireless VPN router (not shown) to facilitate data exchange between the host system 250 and the communication device 100. The wireless VPN router allows a VPN connection to be established directly through a specific wireless network to the communication device 100. The wireless VPN router can be used with the Internet Protocol (IP) Version 6 (IPV6) and IP-based wireless networks. This protocol can provide enough IP addresses so that each mobile device has a dedicated IP address, making it possible to push information to a mobile device at any time. An advantage of using a wireless VPN router is that it can be an off-the-shelf VPN component, and does not require a separate wireless gateway and separate wireless infrastructure. A VPN connection can preferably be a Transmission Control Protocol (TCP)/IP or User Datagram Protocol (UDP)/IP connection for delivering the messages directly to the communication device 100 in this alternative implementation.

Messages intended for a user of the communication device 100 are initially received by a message server 268 of the host system 250. Such messages can originate from any number of sources. For instance, a message can have been sent by a sender from the computer 262b within the host system 250, from a different mobile device (not shown) connected to the wireless network 200 or a different wireless network, or from a different computing device, or other device capable of sending messages, via the shared network infrastructure 224, possibly through an application service provider (ASP) or Internet service provider (ISP), for example.

The message server 268 typically acts as the primary interface for the exchange of messages, particularly e-mail messages, within the organization and over the shared network infrastructure 224. Each user in the organization that has been set up to send and receive messages is typically associated with a user account managed by the message server 268. Some exemplary implementations of the message server 268 include a Microsoft Exchange™ server, a Lotus Domino™ server, a Novell Groupwise™ server, or another suitable mail server installed in a corporate environment. In some implementations, the host system 250 can comprise multiple message servers 268. The message server 268 can also be adapted to provide additional functions beyond message management, including the management of data associated with calendars and task lists, for example.

When messages are received by the message server 268, they are typically stored in a data store associated with the message server 268. In at least some embodiments, the data store can be a separate hardware unit, such as data store 284, with which the message server 268 communicates. Messages can be subsequently retrieved and delivered to users by accessing the message server 268. For instance, an e-mail client application operating on a user's computer 262a can request the e-mail messages associated with that user's account stored on the data store associated with the message server 268. These messages are then retrieved from the data store and stored locally on the computer 262a. The data store associated with the message server 268 can store copies of each message that is locally stored on the communication device 100. Alternatively, the data store associated with the message server 268 can store all of the messages for the user of the communication device 100 and only a smaller number of messages can be stored on the communication device 100 to conserve memory. For instance, the most recent messages (i.e. those received in the past two to three months for example) can be stored on the communication device 100.

When operating the communication device 100, the user may wish to have e-mail messages retrieved for delivery to the communication device 100. The message application 138 operating on the communication device 100 can also request messages associated with the user's account from the message server 268. The message application 138 can be configured (either by the user or by an administrator, possibly in accordance with an organization's IT policy) to make this request at the direction of the user, at some pre-defined time interval, or upon the occurrence of some pre-defined event. In some implementations, the communication device 100 is assigned its own e-mail address, and messages addressed specifically to the communication device 100 are automatically redirected to the communication device 100 as they are received by the message server 268.

The message management server 272 can be used to specifically provide support for the management of messages, such as e-mail messages, that are to be handled by mobile devices. Generally, while messages are still stored on the message server 268, the message management server 272 can be used to control when, if, and how messages are sent to the communication device 100. The message management server 272 also facilitates the handling of messages composed on the communication device 100, which are sent to the message server 268 for subsequent delivery.

For example, the message management server 272 can monitor the user's "mailbox" (e.g. the message store associated with the user's account on the message server 268) for new e-mail messages, and apply user-definable filters to new messages to determine if and how the messages are relayed to the user's communication device 100. The message management server 272 can also, through an encoder (not shown) associated therewith, compress message data, using any suitable compression/decompression technology (e.g. YK compression, JPEG, MPEG-x, H.26x, and other known techniques) and encrypt messages (e.g. using an encryption technique such as Data Encryption Standard (DES), Triple DES, or Advanced Encryption Standard (AES)), and push them to the communication device 100 via the shared network infrastructure 224 and the wireless network 200. The message management server 272 can also receive messages composed on the communication device 100 (e.g. encrypted using Triple DES), decrypt and decompress the composed messages, re-format the composed messages if desired so that they will appear to have originated from the user's computer 262a, and re-route the composed messages to the message server 268 for delivery.

Certain properties or restrictions associated with messages that are to be sent from and/or received by the communication device 100 can be defined (e.g. by an administrator in accordance with IT policy) and enforced by the message management server 272. These may include whether the communication device 100 can receive encrypted and/or signed messages, minimum encryption key sizes, whether outgoing messages must be encrypted and/or signed, and whether copies of all secure messages sent from the communication device 100 are to be sent to a pre-defined copy address, for example.

The message management server 272 can also be adapted to provide other control functions, such as only pushing certain message information or pre-defined portions (e.g. "blocks") of a message stored on the message server 268 to the communication device 100. For example, in some cases, when a message is initially retrieved by the communication device 100 from the message server 268, the message management server 272 can push only the first part of a message to the communication device 100, with the part being of a pre-defined size (e.g. 2 KB). The user can then request that more of the message be delivered in similar-sized blocks by the message management server 272 to the communication device 100, possibly up to a maximum pre-defined message size. Accordingly, the message management server 272 facilitates better control over the type of data and the amount of data that is communicated to the communication device 100, and can help to minimize potential waste of bandwidth or other resources.

The mobile data server 274 encompasses any other server that stores information that is relevant to the corporation. The mobile data server 274 can include, but is not limited to, databases, online data document repositories, customer relationship management (CRM) systems, or enterprise resource planning (ERP) applications. The mobile data server 274 can also connect to the Internet or other public network, through HTTP server 275 or other suitable web server such as a File Transfer Protocol (FTP) server, to retrieve HTTP webpages and other data. Requests for webpages are typically routed through mobile data server 274 and then to HTTP server 275, through suitable firewalls and other protective mechanisms. The web server then retrieves the webpage over the Internet, and returns it to mobile data server 274. As described above in relation to message management server 272, mobile data server 274 is typically provided, or associated, with an encoder 277 that permits retrieved data, such as retrieved webpages, to be decompressed and compressed, using any suitable compression technology (e.g. YK compression, JPEG, MPEG-x, H.26x and other known techniques), and encrypted (e.g. using an encryption technique such as DES, Triple DES, or AES), and then pushed to the communication device 100 via the shared network infrastructure 224 and the wireless network 200. While encoder 277 is only shown for mobile data server 274, it will be appreciated that each of message server 268, message management server 272, and HTTP servers 275 and 279 can also have an encoder associated therewith.

The contact server 276 can provide information for a list of contacts for the user in a similar fashion as the address book on the communication device 100. Accordingly, for a given contact, the contact server 276 can include the name, phone number, work address and e-mail address of the contact, among other information. The contact server 276 can also provide a global address list that contains the contact information for all of the contacts associated with the host system 250.

It will be understood by persons skilled in the art that the message management server 272, the mobile data server 274, the HTTP server 275, the contact server 276, the device manager module 278, the data store 284 and the IT policy server 286 do not need to be implemented on separate physical servers within the host system 250. For example, some or all of the functions associated with the message management server 272 can be integrated with the message server 268, or some other server in the host system 250. Alternatively, the host system 250 can comprise multiple message management servers 272, particularly in variant implementations where a large number of mobile devices need to be supported.

The device manager module 278 provides an IT administrator with a graphical user interface with which the IT administrator interacts to configure various settings for the communication devices 100. As mentioned, the IT administrator can use IT policy rules to define behaviors of certain applications on the communication device 100 that are permitted such as phone, web browser or Instant Messenger use. The IT policy rules can also be used to set specific values for configuration settings that an organization requires on the communication devices 100 such as auto signature text, WLAN/VoIP/VPN configuration, security requirements (e.g. encryption algorithms, password rules, etc.), specifying themes or applications that are allowed to run on the communication device 100, and the like.

A user may wish to access multiple services operating over the same or different networks and providing messages in different formats, which may include, without limiting the scope of such services, e-mail, IM, SMS, MMS, voicemail, and VVM and the like, or multiple services providing messages in the same communication format. For example, the user may wish to access at the communication device 100 e-mail messages received by a user account maintained by the user's enterprise system 250, as well as e-mail messages received by an account provided by a third party service provider. The user may also wish to access messages provided by other messaging or analogous services, for example content published by a content provider and pushed to the communication device 100 via a push server in communication with the device 100 over the wireless network. Such content may include updates or postings received from a social networking service, a news feed, or other content feed.

Such messages and other content may be received and stored in distinct data stores, folders or files at the device 100, together with messages and content generated at the device 100 for transmission via the associated service. For example, each message or content item received or generated at the device 100 may be stored as a separate message or data object in a data store associated with the service, and may be retrievable for presentation to the user using a dedicated application executing at the device 100 and associated with that particular message or content format. In addition, the objects may be indexed for searching on the device 100 either through the dedicated application itself or through a unified search process implemented in the device operating system 134, and retrievable for presentation in a "unified inbox" displayable at the device 100. The unified inbox may be defined conceptually or visually to the user as a message inbox having characteristics similar to those employed in respect of mail clients known in the art, but it will be appreciated by those skilled in the art that the "unified inbox", as referred to herein, need not be limited strictly to such an implementation. The unified inbox may also be considered as a global message or content list, or as a unified view of message or other content information that serves as an entry point for access to a service or application executable on the device. When the unified inbox is invoked, message objects and other content may be retrieved by a collector process from one or more data stores or folders available to the device 100 for presentation in a unified inbox display. The message or content elements displayed in the unified inbox display may include, in the case of messages such as e-mail, header data such as sender, timestamp, and subject line. In addition, or alternatively, at least a portion of the message body content may also be displayed. In the case of other message types, such as instant messages, the information displayed may include message body content in place of message header content.

However, the user may wish to segregate messages received from different messaging services, for example to keep work-related messages received by the enterprise account separate from personal messages received at accounts provided by other services, or to exclude content from social network feeds from the unified inbox, while still including all messages and similar content from other sources in the unified inbox. This may be accomplished by providing separate entry points for filtered subsets of message objects collected by the collector process for the unified inbox, or by providing application entry points for each distinct message or content service provided at the device 100. Each of these entry points may be made easily accessible to the user through the display of associated user interface elements, such as icons, in a graphical user interface displayed at the device 100. Since a number of message and content services may be provided on the device 100, a means for managing the availability of entry points and associated user interface elements may be desirable.

The various message and content services mentioned above may be discovered and provisioned or registered at the device using a number of techniques that will be known to those skilled in the art. Two possible techniques for provisioning or registering a service at the communication device 100 are injection of a service record pertaining to the service at the device and registration using an API. As a non-limiting example of service record injection, referring to FIG. 4B a request for registration may be sent from the communication device 100 to a registration server of a service (not shown). If the request is approved, the registration server may transmit to the communication device 100 a service book containing data and instructions to enable the communication device 100 to provision the service. The service book, when received at the communication device 100, may be self-executing, and may permit the user to enter account information relevant to the associated service. This information is stored in a service record at the device 100. The service book may store several service records, each corresponding to a messaging service provisioned for the device 100. User account can also be transmitted from the communication device 100 to a provisioning server of the service provider such as the server 320. If required, the provisioning server 320 creates a new primary service account for the user, or else associates the transmitted information with an existing account for the user. Thus, if the communication device 100 is provisioned for a message service provided by the message server 238 of FIG. 4A, the primary service account is created at the message server 238. The service may comprise both a primary service account and an associated service account; for example, while a primary service account may provide e-mail service for the user, an associated service account provided by either the primary service provider or an associated service provider may handle the forwarding or redirection of messages from the primary service account to the communication device 100. In other variants, the provisioning process may be managed by a communications carrier via a carrier provisioning server 300, which may provide a front-end system for a value-added service provided by the service provider server 320, as illustrated by the dotted arrows in FIG. 4B.

Not all message or content services need be provisioned by adding or injecting records into a service book or a similar service data repository. As another example, applications installed by the user or an administrator may register or deregister with management module such as an API provided at the device. Registration with the API provides the application with access to other functions and features of the device operating system 134, including management and storage of folders and other data structures containing application-related data (such as messages and other content), as well as eligibility of application-related messages and content for inclusion in the unified inbox.

Once the messaging service or messaging application (hereinafter called a "service" for ease of reference) is provisioned or otherwise installed or registered at the communication device 100, the communication device 100 may transmit data to, and receive data from, the primary service. When the service is provisioned or registered, indicators specific to the service may be downloaded and stored or otherwise defined at the communication device 100. These indicators (which may be provided in the form of a user interface element, such as an icon or other graphical representation) may be optionally displayed to the user via a graphical user interface, as discussed below, to provide the user of the communication device 100 with a means for accessing an entry point for that service. The communication device 100 may maintain a registry of data pertaining to all services provisioned on the communication device 100, and the graphical user interface of the communication device may be configured to automatically display an indicator for each entry point for each such service listed in the registry. Each such indicator may include a pointer or address identifying its associated service entry point. If an indicator is associated with the listed service, the graphical user interface may display that indicator; otherwise, a default indicator may be displayed. A registry stored at the communication device 100 may comprise a record for each provisioned or registered service. Each record, in addition to data required for communication with the service, may also comprise one or more fields with URL or other address information for retrieving content (such as an icon graphic) to display for the entry point corresponding to the service. If such address information is present, the communication device 100 may retrieve the indicator from that address for display on the device display 110. If no address for retrieving such content is provided in the registry, the communication device 100 may display a default indicator.

Figure 5A:
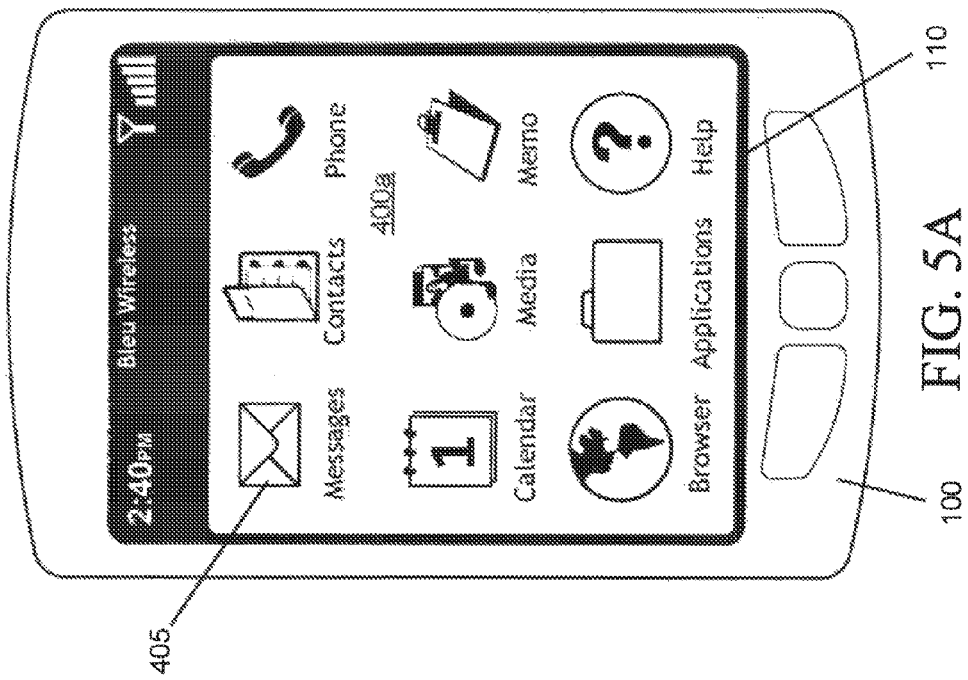

In some instances, several similar services, such as several e-mail services provided by different service providers, may be provisioned or registered at the device. In other instances, several different services, such as e-mail, SMS, and VVM, provided by one or more service providers, may be registered or provisioned at the device. In either case, in one embodiment all messages received via these different services may be displayed to the user on the communication device 100 in the unified inbox. This provides the user with easy access to all messages received at the communication device 100, regardless of provenance. In this manner a user interface of the communication device 100 may provide a single display representative of multiple service entry points to the user, since each element displayed in the unified inbox may be actuatable to invoke a separate application or view associated with the particular message or content format of that element. An exemplary graphical user interface 400*a* is illustrated in FIG. 5A. A single indicator representative of a service entry point 405 for a unified inbox is presented in the graphical user interface 400*a*. The user interface 400*a* may represent a "home screen" or landing screen using which the user may access applications and services provided at the device 100. The user may actuate this service entry point 405 to invoke a messaging application to gain access to the unified inbox, which may contain messages received via one or more services. It will be appreciated by those skilled in the art that references to an "inbox", such as a unified inbox, are not limited to data stores or views of incoming messages. Inboxes may comprise received messages, sent or pending messages, folders, or other repositories of message or content data, including but not limited to the various formats of messages and content described herein. An example of a unified inbox is shown displayed in the user interface 400*b* of FIG. 5B, which includes a single listing of messages 480. Although not shown in FIG. 5B, the messages displayed in the user interface 400*b* may include messages or content sent or received using different user accounts associated with applications or services provided at the device 100, and in different formats as mentioned above.

In another embodiment, one or more indicators associated with one or more service entry points may be provided to the user via the user interface. As shown in FIG. 5C, the graphical user interface 400*c* comprises the first service entry point indicator 405 and a second service entry point indicator 410. In this example, the indicator 410 is representative of an e-mail inbox. While the first indicator 405 is associated with the unified inbox as described above, the second indicator 410 is expressly associated with a defined account (here identified with an e-mail address, which is truncated in the user interface 400*c* as "eblofeld@ . . . "). Thus, actuation via the user interface of the first indicator 405 may invoke the messaging application associated with the unified inbox, thus presenting a view similar to that of FIG. 5B; actuation of the second indicator 410 may invoke a further messaging application, or a further instance of the first messaging application, that retrieves and displays only messages associated with that defined account. However, if the only message or content service provisioned or registered at the device is the service associated with that defined account, the result of actuating the first indicator 405 and the second indicator 410 will be the same; both may result in the display of the user interface 400*b* of FIG. 5B.

FIG. 5D illustrates a further user interface 400*d* in which a third indicator 415 associated with a third service entry point is displayed. When any one of the service entry points 405, 410, 415 is actuated, an application associated with that service entry point is invoked to provide user access to a mailbox or other data store associated with that service. In the example of FIG. 5D, the third service entry point indicator 415 is in focus or highlighted (as denoted by the outline 460), and the user interface 400*d* may display, when a given indicator is in focus, an account identifier associated with the service associated with that indicator. Thus, in FIG. 5D, the user interface 400*d* includes the account identifier 450 "ernst@bleuville.com" while the corresponding indicator 415 is in focus. In addition, the user interface 400*d* may also display a badge or message count indicator 465 indicating a status of the messages or content associated with all services registered at the device 100, such as a number of unread messages and whether any of those messages were received since the inbox was last viewed. In this example, an indicator "*53" may indicate that there are fifty-three unread messages across all services provided on the device 100, and the asterisk may indicate that at least one of those messages had been received since any one of the entry points associated with the various services had been last accessed. In an alternate embodiment, the message count indicator 465 may represent only the status of messages or content associated with one particular service when the indicator 410, 415 associated with that service is in focus. If the focus is moved to another one of the service entry point indicators by means of an input device or auxiliary input device 112, then the user interface 400d may display the user address corresponding to that associated service. The message count indicator can take any other form of textual or graphical indicator. In addition or alternatively, the message count indicator may be presented using a non-visual device interface including, but not limited to, tactile, auditory, or vibratory interface mechanisms.

Figure 5F:
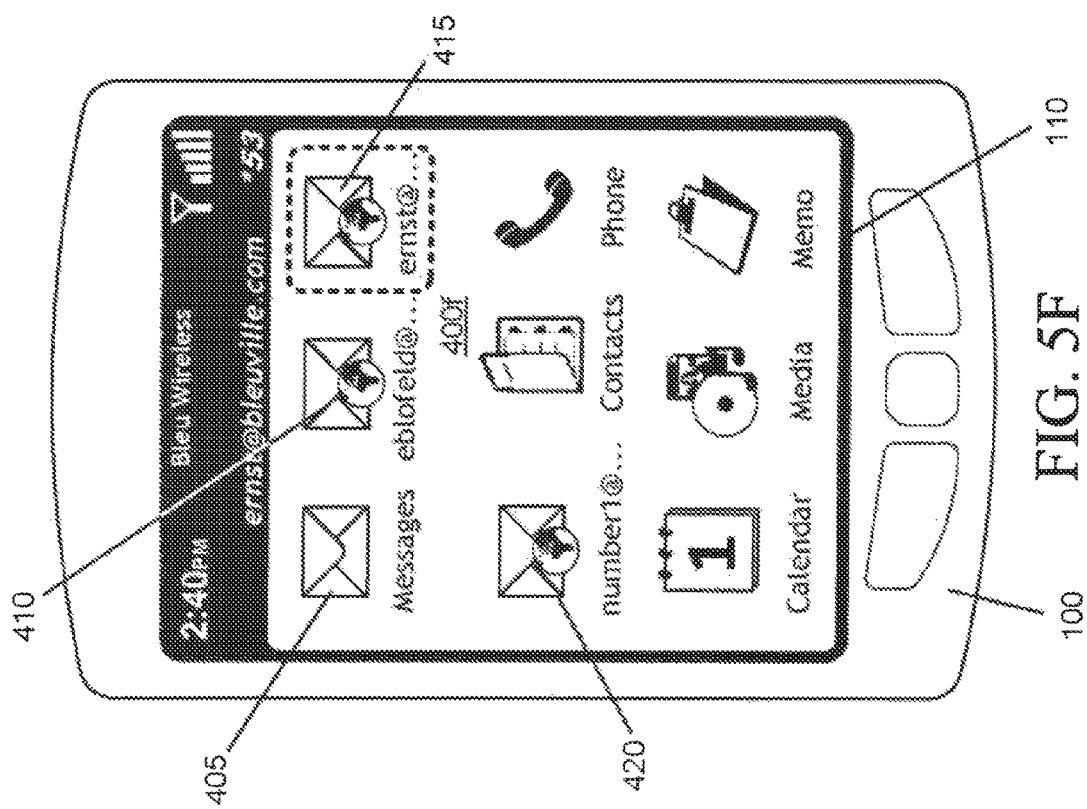

Thus, first service entry point indicator 405 may be associated with the unified inbox, while the remaining service entry point indicators 410, 415 are associated with separate services, which may include entry points for filtered views of the unified inbox content that are also registered or provisioned on the device 100. Thus, messages or content received or transmitted via one of the separate services associated with service entry point indicators 410, 415 may be displayed both in an inbox associated with that indicator, as well as in the unified inbox. There may, of course, be further services provided at the device 100, and fourth, fifth, or further indicators displayed in the user interface, for example as shown in the example of FIG. 5F, which includes a fourth indicator 420 that may correspond to still a further service.

Optionally, the communication device 100 may be configured to hide messages that are displayable in inboxes associated with the service entry points 410, 415. This may be configured by the user of the communication device 100 or by an administrator. For example, FIG. 16A depicts an options interface 580a, displayable on the display 110 of the communication device 100. The options interface 580a provides configuration options which may be selected for the messaging services provided at the communication device 100. One configuration option in this example is an "Inbox Management" option 582, which may be used to define the message types that are included in the unified inbox. FIG. 16B illustrates a possible user interface 580b providing configuration options for inbox management, which provides options for selecting one or more of the accounts of services provisioned on the device 100 such that messages associated with that account or service are displayed in the unified mailbox on the device 100. In the example of FIG. 16B, two e-mail accounts are provisioned: a first "desktop" account ("eblofeld@spectre.com"), which may be associated with an enterprise system such as host system 250, and an account associated with an Internet service provider ("ernst@bleuville.com"). There are accordingly entries for the two accounts selected in the first options area 584 of the user interface 580b. If other services are available on the communication device 100, they may be listed in this options interface 580b as well. Text, visual voicemail, and a data push service are also listed in the second options area 586. Selection of these various accounts and message types may thus define the scope of messages displayed in the unified inbox, and the types of messages that are therefore hidden from view in the unified inbox. The option to "show" or "hide" the messages may also be stored in the registry described above. If messages associated with a service are thus configured to be hidden, the unified inbox may therefore no longer represent a unified collection of messages associated with every service registered on the communication device 100.

A service may be made available for selection in the options interface 400 once it is provisioned on the communication device 100 or upon registration with the API as described above. A listener process operating at the device 100 may detect the addition of services by provisioning or registration, and provide a notification to a configuration interface function to include these services and their related accounts in the configuration screen 580b.

Figure 6:
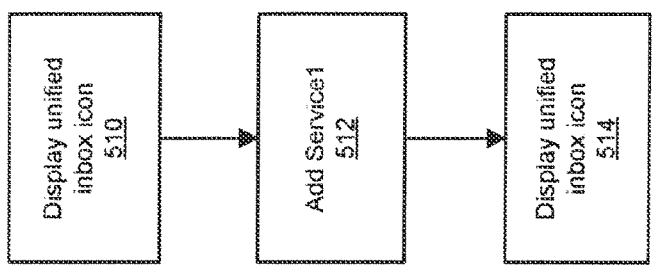

As suggested above, when only one messaging service is provisioned on the communication device 100, it is not necessary to display both a service entry point indicator 405 for a unified inbox as well as a separate service entry point indicator 410 for that messaging service, since the content of the unified inbox and the inbox associated with the messaging service may contain identical data. Thus, when the communication device 100 is provisioned with only a first messaging account, the communication device 100 may be configured to automatically hide the service entry point indicator associated with that account, in favour of displaying only the service entry point indicator 405 for the unified inbox. This process is illustrated in FIG. 6. At 510, prior a first service being provisioned or registered at the communication device, only the unified inbox indicator 405 ("icon") is displayed. At 512, the addition of a new service, Service1, is detected, for example using the aforementioned listener process, or by otherwise detecting an insertion of a service record for Service1 in the registry. As a result, at 514, the communication device 100 continues to display only the indicator for the unified inbox.

Figure 7:
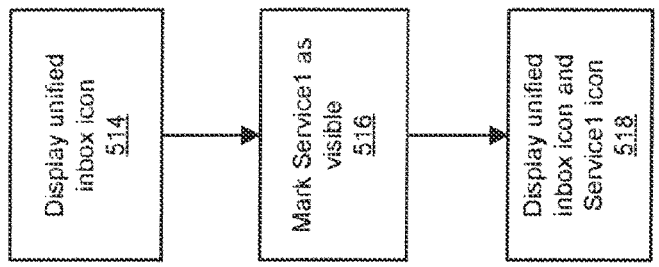
FIGS. 6 to 15 are flowcharts illustrating processes for managing display of icons for providing access to messaging entry points at the device.
Figure 8:
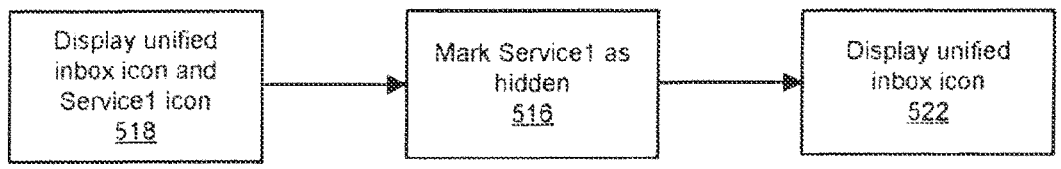

The user or administrator of the communication device 100 may elect to display the indicator for the service entry point associated with the first service, regardless of whether the inbox associated with a second service entry point would be duplicative of the unified inbox. Thus, in FIG. 7, at 514 only the unified inbox indicator 405 is displayed although the communication device 100 has been provisioned with a first service associated with a first account. At 516, detection of an instruction to mark the service entry point associated with that first service and account as "visible". Consequently, at 518, both the service entry point indicators for the unified inbox and the first service are displayed in the graphical user interface of the communication device 100, for example as shown in FIG. 5C. This process may be reversed, as shown in FIG. 8. While both the service entry point indicators for the unified inbox and the first service, Service1, are displayed at 518, an instruction is detected to mark the service entry point associated with the first service as "hidden". Consequently, only the service entry point indicator 405 for the unified inbox is displayed in the device's graphical user interface.

Figure 9:
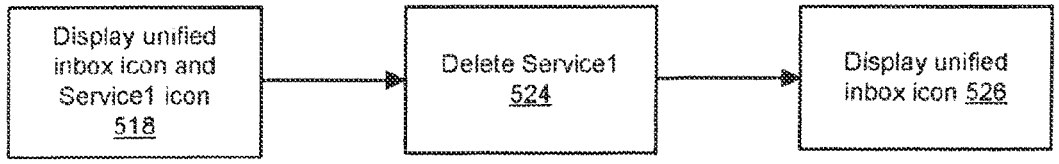

When a service is deleted from the registry or deregistered via the API, the service entry point indicator corresponding to that service no longer needs to be displayed in the graphical user interface. As shown in FIG. 9, initially the communication device 100 may be configured to display two service entry point indicators, one for the unified inbox and one for the first service Service1. At 524, deletion of the first service from the registry or deregistration is detected. Accordingly, the communication device 100 displays only the service entry point indicator for the unified inbox at 526.

Figure 10:

As noted above, when only a first service is provisioned or registered at the communication device 100, it may be deemed unnecessary to display both a service entry point indicator for the service and a service entry point indicator for the unified inbox, so the communication device 100 may be configured to automatically hide the service entry point indicator associated with that first service. However, when a second service is provisioned or registered at the communication device 100, it may be desirable to access separate service entry points for each of the first and second services in addition to the unified inbox, so that the user is provided with the ability to easily access messages associated only with the first service, only with the second service, or with both. If separate access means to the entry points for the first or second service are not provided in the user interface 400a, then the user may be required to invoke the unified inbox, select a message associated with the desired service, then actuate the selected message in order to invoke an application providing access to the desired message inbox. Alternatively, the user may be required to navigate to an applications folder to locate and invoke an entry point for the application related to the message. It will be understood that these alternatives increase the time required for the user to access the desired message inbox, and requires increased manipulation of input devices (such as the trackball, touchscreen interface, touchpad, and the like), potentially resulting in increased wear and tear on the device's input systems. Thus, as indicated in FIG. 10, at 514 only the service entry point indicator for the unified inbox is displayed service records are injected into the registry or any services are otherwise provisioned or registered at the device. At 528, services Service1 and Service2 are added for first and second messaging services, respectively. Consequently, at 530, the user interface of the communication device 100 may display three service entry point indicators for the unified inbox, the first service, and the second service. The user interface 400a would thus change from displaying only one service entry point indicator, such as in FIG. 4A, to three, as in FIG. 5D.

Figure 11:
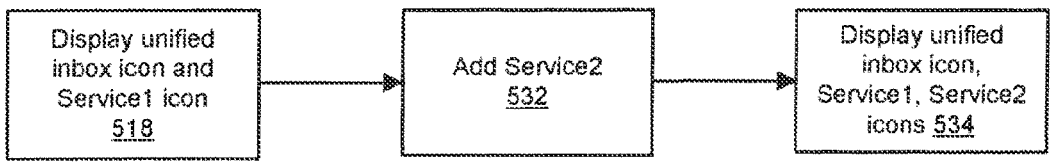

A similar result to block 530 results if the communication device 100, originally provisioned or registered with a single service, is configured to display both the service entry point indicators for the unified inbox and for the first service (Service1), as shown in FIG. 11 at 518. The service entry point indicator associated with Service1 is displayed in response to an instruction to expressly show that service entry point indicator (as described with respect to FIG. 7). When a new service, such as Service2, is added at 532, the result is that three service entry point indicators may be displayed in the graphical user interface of the device 100, similar to the result 530 of FIG. 10.

Figure 12:
Figure 13:
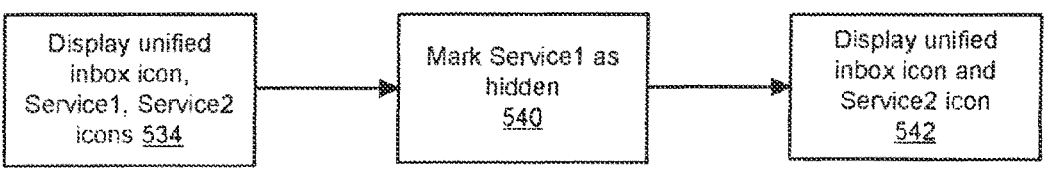

Subsequently, if one of the services is removed from the device 100 and thus has its service records deleted or is deregistered, the number of service entry point indicators displayed at the device 100 is changed. Turning to FIG. 12, the communication device 100 initially displays service entry point indicators for the unified inbox and each of a first and second service Service1, Service2, respectively. At 536, Service2 is removed. Consequently, at 538, only the service entry point indicators for the unified inbox and the first service, Service1, are shown. It should be recalled that the service entry point indicator associated with the first service is shown in the end result of this process because there had been a previous instruction to expressly make that service entry point indicator visible, as discussed with respect to FIG. 7. If the communication device 100 initially displayed service entry point indicators for each of the unified inbox and each of the first and second services as shown in FIG. 13 at 534, and then had chosen to "hide" the service entry point indicator for the first service 540, then as a result the user interface of the communication device 100 would display only the service entry point indicators for the unified inbox and the second service at 542.

Figure 15:
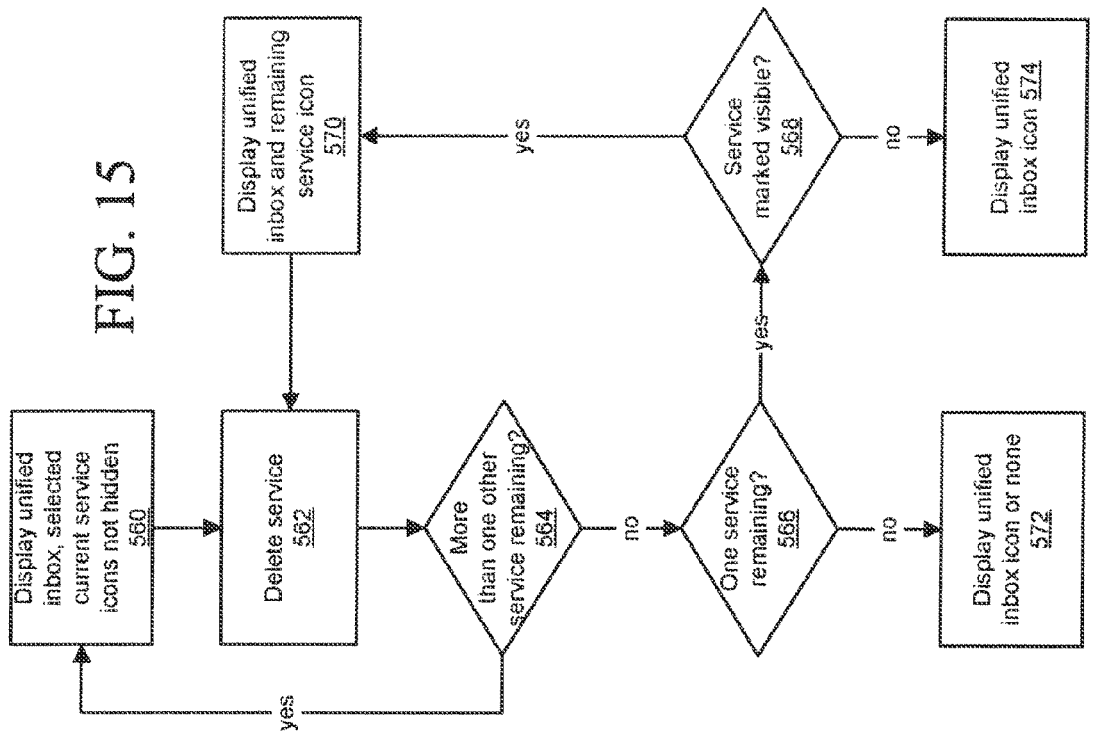
Figure 14:
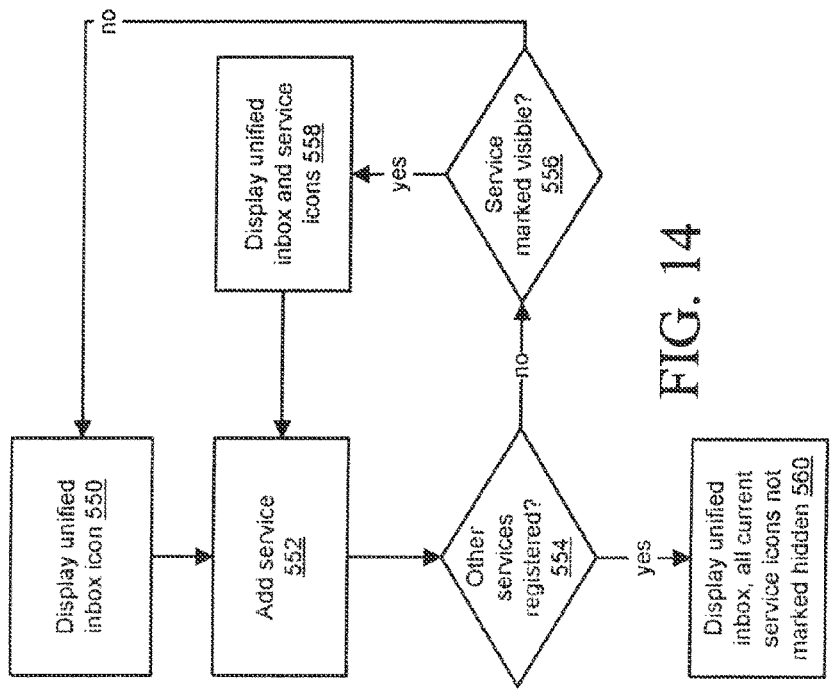

The processes described above are represented in the generic processes illustrated in FIGS. 14 and 15. FIG. 14 illustrates a process for managing the display of indicators, such as icons, on a user interface display such as a home screen. At 550, initially only a unified inbox indicator (or "icon") is displayed. At this stage, there may or may not be services already provisioned or registered at the communication device 100. At 552, the addition of a service is detected, as described above. A determination is made at 554 whether other services are already provisioned or registered at the device 100, for example by querying a registry at the device. 100. If there are no other services currently provisioned or registered, then the added service is the first service; a determination is made at 556 whether an instruction has been received to mark the service as visible, and if so, an indicator for both it and the unified inbox is displayed at 558. Otherwise, only the unified inbox icon 550 is displayed. However, if other services are already registered or provisioned on the device 100, then at 560 not only the indicator for the unified inbox is displayed, but also the indicators for all currently registered or provisioned services, provided those services had not been marked as hidden.

FIG. 15 illustrates a process for managing the display of indicators in response to an instruction to delete or deregister a service at the device 100. At 560, the device 100 displays indicators for the unified inbox, as well as for any services that are not currently marked as hidden, provided there are more than two services registered or provisioned at the device 100. (If only one service is provisioned at the device 100 and it has been marked as visible, then its indicator will be displayed as well at 560). At 562, the device 100 determines that a service has been deleted or deregistered. At 564, a determination is made at 564 whether there is more than one service remaining at the device. If this is the case, then the process returns to 560. Otherwise, a determination is made whether there remains only one service registered or provisioned at the device at 566. If there is only one service, then at 568 a determination is made whether the service has been marked as visible. If so, then both its indicator and the unified inbox indicator are displayed at 570. If it has not been marked visible, then only the unified inbox icon is displayed at 574. If, however, there is no registered or provisioned service remaining, then at 572 only the unified inbox indicator is displayed; however, there may not be any content or messages associated with the unified inbox. Thus, in some embodiments, no indicator for any inbox may be displayed at all at 572.

Figure 17:
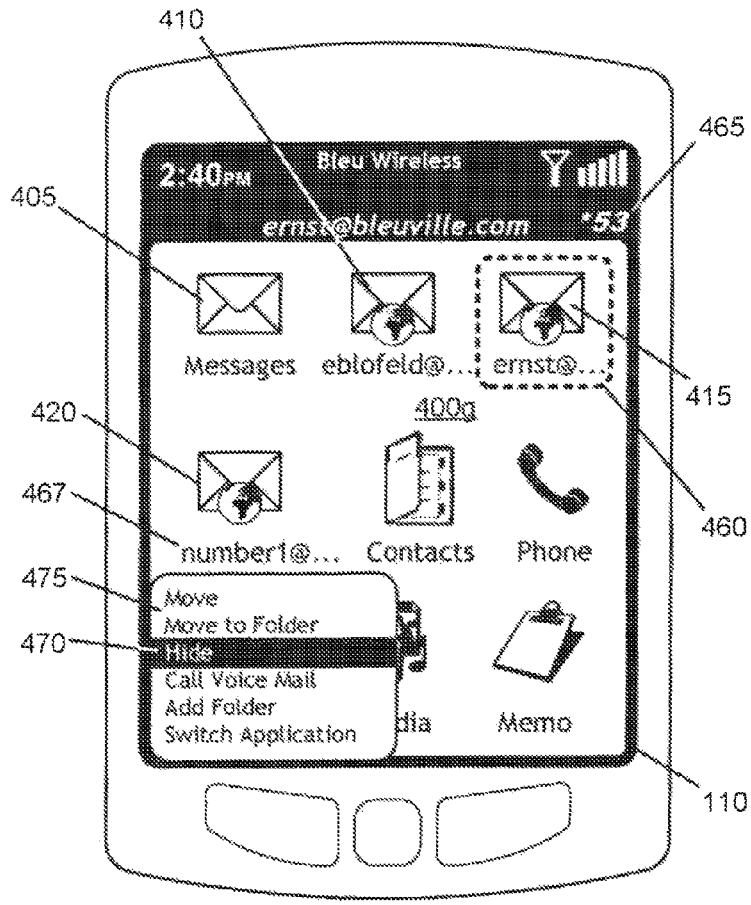
FIG. 17 is an illustration of a further graphical user interface for managing display of icons for application entry points on the mobile device.

An instruction to mark a service as hidden or visible may be received via the options interfaces 580a or 580b when the communication device 100 is in a configuration mode. Alternatively, an option to hide select service entry points and associated indicators may be provided when the service entry point indicators are displayed. As shown in FIG. 17, the graphical user interface 400g is shown, with service entry point indicators 405, 410, 415, and 420 as well as other application entry point indicators for various applications. This particular view of the user interface 400g may be considered a home screen, as it provides general access to various services and applications on the device 100. In this example, functionality is provided to permit control of the visibility of application entry point icons on the home screen, but in some embodiments it can also be used to control visibility of the messaging service entry point icons on the home screen as well. When a given service or application entry point indicator is in focus—for example, the entry point indicator 415 is shown in focus, as indicated by outline 460—the user may invoke a context menu 470 which may provide one or more options, including an option to "hide" the entry point in focus 475. The foregoing thus provides a system and method for determining which service entry point indicators associated with the provisioned services are displayed on the home screen, and which are hidden. In the embodiments described above, unless specified otherwise, service entry point indicators associated with each individual provisioned or registered service may be displayed in the graphical user interface 400g only if more than one service is provisioned or registered on the communication device 100. If only one provisioned or registered service is available, then the service entry point indicator associated with that service may be hidden by default, and only the service entry point indicator for a unified inbox may be displayed.

The foregoing methods and systems of automatically managing the display of user interface elements, such as the aforementioned service entry point indicators, provides for automatic reduction of the number of user interface elements displayable within the home screen of the device 100, with consequent savings in processing resources required to render and display the various user interface elements on the home screen.

The graphical user interface 300 may provide additional information regarding the mailboxes associated with each service. Referring again to FIG. 17, when a service entry point indicator 415 for a given service is in focus, the communication device 100 may display on the user interface 400g a message count indicating the number of unread messages 465, and additionally or alternatively an indicator indicating the presence of new messages in the associated inbox. If the focus is moved to the service entry point indicator corresponding to the unified inbox 405, the message count may comprise a global message count across all existing inboxes, or alternatively only for those messages displayable in the unified inbox, as well as the optional new message indicator. If the focus is moved to another indicator in the user interface 400g not related to a messaging service, the user interface 400g may display the global message count and the optional new message indicator.

Figure 18:
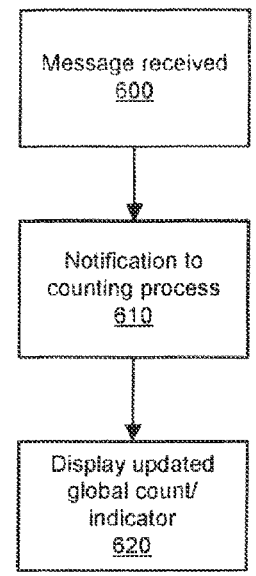
FIGS. 18 and 19 are flowcharts illustrating processes for updating a message count in a graphical user interface.
Figure 19:
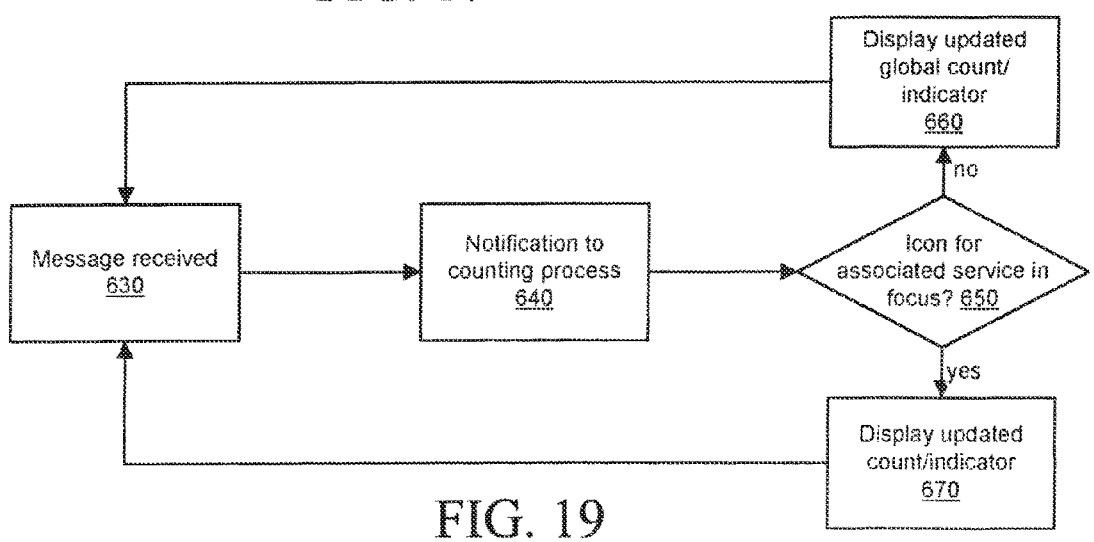

A method for tracking unread message counts is shown in FIG. 18. At 600, the communication device 100 receives a message. A thread or listener process tracking received and read or unread messages for the services on the device 100 is notified at 610, and the count of unread messages is updated accordingly. At 620, a global count such as that shown in the indicator 465 is updated to reflect the new total of unread messages, and to reflect the existence of new unread messages since the last time any message listing was displayed. In an alternative embodiment, illustrated in FIG. 19, the indicator 465 may instead display the status of messages for a particular service whose indicator is currently in focus in the user interface. At 630, the communication device 100 receives a message, and a process tracking received messages for the service through which the message was received is notified at 640. The communication device 100 then determines at 650 whether a service entry point indicator for that particular service is in focus on the user interface 400g. If it is in focus, then the count of unread messages is updated on the user interface 400g, and the new message indicator may be updated as well at 670. If the service entry point indicator for that particular service is not in focus, the communication device 100 may be configured to display the global total of unread messages as a default setting, in which case the count of unread messages is updated on the user interface 400g to reflect the new global total at 660, and the new message indicator may be updated as well. The device 100 then waits for further messages at 600, although the count of unread messages and the new message indicator may be updated in the meantime as the user invokes messaging applications and reads messages, and listener processes detect changes to the inbox states associated with the various services. In a further alternative, the communication device 100 may consistently display the global count, regardless of which user interface element is in focus in the user interface 400g.

As a further option, the labels and icons provided for each service entry point may be configurable by the user. For example, customized icons may be downloaded or created for each service. Also, as shown in FIG. 17, a label 467 is provided under each indicator for each service entry point. For a message service entry point, this label could provide the account name or user's account address for the corresponding service, but the name or address may be truncated due to excessive length. An option may be provided for the user to configure the service entry point indicator to display a nickname or abbreviated name of the user's choosing.

It will be appreciated that various services may be provided by entities affiliated with the user, while other services are provided by third-party service providers. A first messaging account may be provided by an enterprise service associated with the user, for example using the message server 238 of FIG. 4, whereas other messaging accounts may be provided by third-party Internet service providers. In one embodiment, the visibility of the service entry points indicators 410, 415, 420 associated with third-party Internet service providers may be configurable at the communication device 100 by the user through the use of the options described above, while the visibility of the service entry point indicator associated with the enterprise service may be configurable only by an administrator of the enterprise system. However, by implementing the automated method of determining the display of various user interface elements pointing to service entry points, it is not necessary for an administrator of the host system 250 to define rules concerning the display of entry point indicators and to push these rules to the communication device 100, thus reducing the amount of data required to be transmitted to the device 100.

The systems and methods disclosed herein are presented only by way of example and are not meant to limit the scope of the invention. Other variations of the systems and methods described above will be apparent to those skilled in the art and as such are considered to be within the scope of the invention. For example, it should be understood that while the foregoing graphical user interface examples described and illustrated herein may be suitable for touchscreen displays, similar interfaces, systems and methods may be implemented with other types of displays 110 and other user interface subsystems 112. Actuation of service entry points indicators and focus on elements within a graphical user interface may therefore be accomplished by interacting with a touchscreen, or alternatively through use of controls such as buttons, trackballs, scroll wheels, touchpads, touchscreen displays and the like. The embodiments described above, presented in the context of multiple e-mail services, may also be implemented with one or more alternate messaging services, including without limitation SMS, MMS, and VVM. It should also be appreciated that steps and the order of the steps in the processing described herein may be altered, modified and/or augmented and still achieve the desired outcome.

The systems' and methods' data may be stored in one or more data stores. The data stores can be of many different types of storage devices and programming constructs, such as RAM, ROM, flash memory, programming data structures, programming variables, etc. It is noted that data structures describe formats for use in organizing and storing data in databases, programs, memory, or other computer-readable media for use by a computer program.

Code adapted to provide the systems and methods described above may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code.

A portion of the disclosure of this patent document contains material which is subject to copyright protection. The copyright owner has no objection to the facsimile reproduction by any one of the patent document or patent disclosure, as it appears in the Patent and Trademark Office patent file or records, but otherwise reserves all copyrights whatsoever.

The invention claimed is:

1. A method implemented by a communication device, the method comprising:
   determining a count of one or more messaging accounts that are registered on the communication device;
   when a plurality of messaging accounts are registered on the communication device according to the determining, providing user interface access to messages of each of the plurality of messaging accounts by displaying in a home screen of the communication device:
      a user interface element corresponding to each of the plurality of messaging accounts; and
      a user interface element for a unified inbox, the unified inbox providing access to messages for each of the plurality of messaging accounts;
   and when only one messaging account is registered on the communication device according to the determining, providing user interface access to messages of the one messaging account by displaying the user interface element for the unified inbox in the home screen without displaying another user interface element corresponding to the one messaging account,
   wherein, for each of the plurality of messaging accounts, actuation of a specific user interface element corresponding to a respective messaging account leads to a filtered view of the unified inbox, the filtered view displaying a subset of messages of the unified inbox, the subset of messages associated with the respective messaging account.

2. The method of claim 1, wherein the plurality of messaging accounts are registered on the communication device, the method further comprising:
   receiving an instruction to mark a selected one of the plurality of messaging accounts as hidden; and
   removing the user interface element corresponding to the selected messaging account from the home screen.

3. The method of claim 2, the method further comprising:
   determining that all but one of the plurality of messaging accounts has been marked as hidden on the communication device; and
   providing user interface access to the messages of the one of the plurality of messaging accounts by displaying the user interface element for the unified inbox in the home screen.

4. The method of claim 1, further comprising initially querying a registry at the communication device to determine a number of messaging accounts registered on the communication device.

5. The method of claim 1, wherein each of the plurality of messaging accounts is an email account.

6. The method of claim 1, wherein the plurality of messaging accounts comprises at least two different types of messaging accounts.

7. The method of claim 6, wherein the types of messaging accounts are selected from the group comprising: email, social networking, IM, and SMS.

8. The method of claim 1, further comprising displaying a message count in the home screen of the communication device, the message count comprising:
   when a user interface element corresponding to one of the plurality of messaging accounts is selected, a number of unread messages for that messaging account; and
   when a user interface element corresponding to one of the plurality of messaging accounts is not selected, a number of unread messages comprised in the unified inbox.

9. A communication device, including:
   a display; and
   a processor configured to:
      determine a count of one or more messaging accounts that are registered on the communication device;
      when a plurality of messaging accounts are registered on the communication device according to the determining, provide user interface access to messages of each of the plurality of messaging accounts by displaying in a home screen on the display:
         a user interface element corresponding to each of the plurality of messaging accounts; and
         a user interface element for a unified inbox, the unified inbox providing access to messages for each of the plurality of messaging accounts;
      and when only one messaging account is registered on the communication device according to the determining, provide user interface access to messages of the one messaging account by displaying the user interface element for the unified inbox in the home screen without displaying another user interface element corresponding to the one messaging account,
      wherein, for each of the plurality of messaging accounts, actuation of a specific user interface element corresponding to a respective messaging account leads to a filtered view of the unified inbox, the filtered view displaying a subset of messages of the unified inbox, the subset of messages associated with the respective messaging account.

10. The communication device of claim 9, wherein the plurality of messaging accounts are registered on the communication device, and the processor is further configured to:
    receiving an instruction to mark a selected one of the plurality of messaging accounts as hidden; and
    removing the user interface element corresponding to the selected messaging account from the home screen.

11. The communication device of claim 10, wherein the processor is further configured to:
    determine that all but one of the plurality of messaging accounts has been marked as hidden on the communication device; and
    provide user interface access to the messages of the one of the plurality of messaging accounts by displaying the user interface element for the unified inbox in the home screen.

12. The communication device of claim 9, wherein the processor is further configured to initially query a registry at the communication device to determine a number of messaging accounts registered on the communication device.

13. The communication device of claim 9, wherein each of the plurality of messaging accounts is an email account.

14. The communication device of claim 9, wherein the plurality of messaging accounts comprises at least two different types of messaging accounts.

15. The communication device of claim 14, wherein the types of messaging accounts are selected from the group comprising: email, social networking, IM, and SMS.

16. The communication device of claim 9, wherein the processor is further configured to display a message count in the home screen, the message count comprising:
  when a user interface element corresponding to one of the plurality of messaging accounts is selected, a number of unread messages for that messaging account; and
  when a user interface element corresponding to one of the plurality of messaging accounts is not selected, a number of unread messages comprised in the unified inbox.

17. The communication device of claim 9, wherein the display comprises a touchscreen display.

18. A non-transitory computer readable medium bearing code which, when executed by a processor of a communication device, causes the communication device to:
  determine a count of one or more messaging accounts that are registered on the communication device;
  when a plurality of messaging accounts are registered on the communication device according to the determining, provide user interface access to messages of each of the plurality of messaging accounts by displaying in a home screen on the display:
    a user interface element corresponding to each of the plurality of messaging accounts; and
    a user interface element for a unified inbox, the unified inbox providing access to messages for each of the plurality of messaging accounts;
  and when only one messaging account is registered on the communication device according to the determining, provide user interface access to messages of the one messaging account by displaying the user interface element for the unified inbox in the home screen without displaying another user interface element corresponding to the one messaging account,
  wherein, for each of the plurality of messaging accounts, actuation of a specific user interface element corresponding to a respective messaging account leads to a filtered view of the unified inbox, the filtered view displaying a subset of messages of the unified inbox, the subset of messages associated with the respective messaging account.

* * * * *